(12) United States Patent
Terem et al.

(10) Patent No.: US 11,736,745 B2
(45) Date of Patent: Aug. 22, 2023

(54) VIDEO DISTRIBUTION SYSTEMS AND METHODS

(71) Applicant: SYNAMEDIA LIMITED, Staines upon Thames (GB)

(72) Inventors: Amotz Terem, Jerusalem (IL); Reuven Nimrod, Mevasseret Zion (IL); Avi Fruchter, Neve Daniel (IL)

(73) Assignee: SYNAMEDIA LIMITED, Staines upon Thames (GB)

( * ) Notice: Subject to any disclaimer, the term of this patent is extended or adjusted under 35 U.S.C. 154(b) by 0 days.

(21) Appl. No.: 17/677,281

(22) Filed: Feb. 22, 2022

(65) Prior Publication Data
US 2022/0182693 A1 Jun. 9, 2022

Related U.S. Application Data

(63) Continuation of application No. 16/732,514, filed on Jan. 2, 2020, now Pat. No. 11,297,358.

(51) Int. Cl.
| | |
|---|---|
| *H04N 21/234* | (2011.01) |
| *H04N 21/235* | (2011.01) |
| *H04N 21/239* | (2011.01) |
| *H04N 21/258* | (2011.01) |
| *H04N 21/262* | (2011.01) |
| *H04N 21/426* | (2011.01) |

(Continued)

(52) U.S. Cl.
CPC ... *H04N 21/23424* (2013.01); *H04N 21/2353* (2013.01); *H04N 21/2393* (2013.01); *H04N 21/25866* (2013.01); *H04N 21/6587* (2013.01); *H04N 21/812* (2013.01); *H04N 21/858* (2013.01)

(58) Field of Classification Search
CPC ............................................... H04N 21/23424
See application file for complete search history.

(56) References Cited

U.S. PATENT DOCUMENTS

| | | |
|---|---|---|
| 8,495,675 B1 | 7/2013 | Philpott et al. |
| 8,549,550 B2 | 10/2013 | Lopatecki |

(Continued)

OTHER PUBLICATIONS

How to do SCTE 35-based Dynamic Ad Insertion for Live streaming with Unified Origin (https://www.unified-streaming.com/blog/how-do-scte-35-based-dynamic-ad-insertion-live-streaming-unified-origin), downloaded on Dec. 30, 2019.

(Continued)

*Primary Examiner* — Hsiungfei Peng
*Assistant Examiner* — Fred Peng
(74) *Attorney, Agent, or Firm* — Finnegan, Henderson, Farabow, Garrett & Dunner, LLP

(57) ABSTRACT

A multimedia content selection system includes at least one processor executing instructions for performing operations. The operations include receiving a playback request from a playback unit, including a content identifier, providing, to the playback unit, a manifest with at least a set of content segment identifiers based on the content identifier, each content segment identifier identifying a content segment associated with a content stream, receiving a content stream request comprising one of the content segment identifiers, and selecting a segment for playback from the content segment associated with the received content segment identifier, determined using a set of content selection rules.

16 Claims, 13 Drawing Sheets

(51) Int. Cl.
*H04N 21/658* (2011.01)
*H04N 21/81* (2011.01)
*H04N 21/6587* (2011.01)
*H04N 21/858* (2011.01)

(56) References Cited

U.S. PATENT DOCUMENTS

| | | |
|---|---|---|
| 9,066,115 B1 | 6/2015 | Cherry et al. |
| 9,438,936 B1 | 9/2016 | Srinivasan et al. |
| 2009/0150930 A1 | 6/2009 | Sherwin et al. |
| 2014/0344880 A1 | 11/2014 | Geller et al. |
| 2015/0088801 A1* | 3/2015 | Sbaiz .................. G06Q 10/10 706/45 |
| 2015/0371280 A1* | 12/2015 | Bjordammen ..... G06Q 30/0269 705/14.66 |
| 2017/0064413 A1 | 3/2017 | Nayak et al. |
| 2017/0339114 A1 | 11/2017 | Watson et al. |
| 2018/0307998 A1* | 10/2018 | Strachan ................ G06N 7/005 |
| 2018/0343495 A1 | 11/2018 | Loheide et al. |
| 2019/0075339 A1* | 3/2019 | Smith .............. H04N 21/25883 |
| 2020/0304868 A1 | 9/2020 | Ganjam et al. |
| 2020/0367056 A1 | 11/2020 | Hodge et al. |

OTHER PUBLICATIONS

European Search Report, European Application No. 20217323.3-1209 for Synamedia Limited, dated May 1 o, 2021 (7 pages).

\* cited by examiner

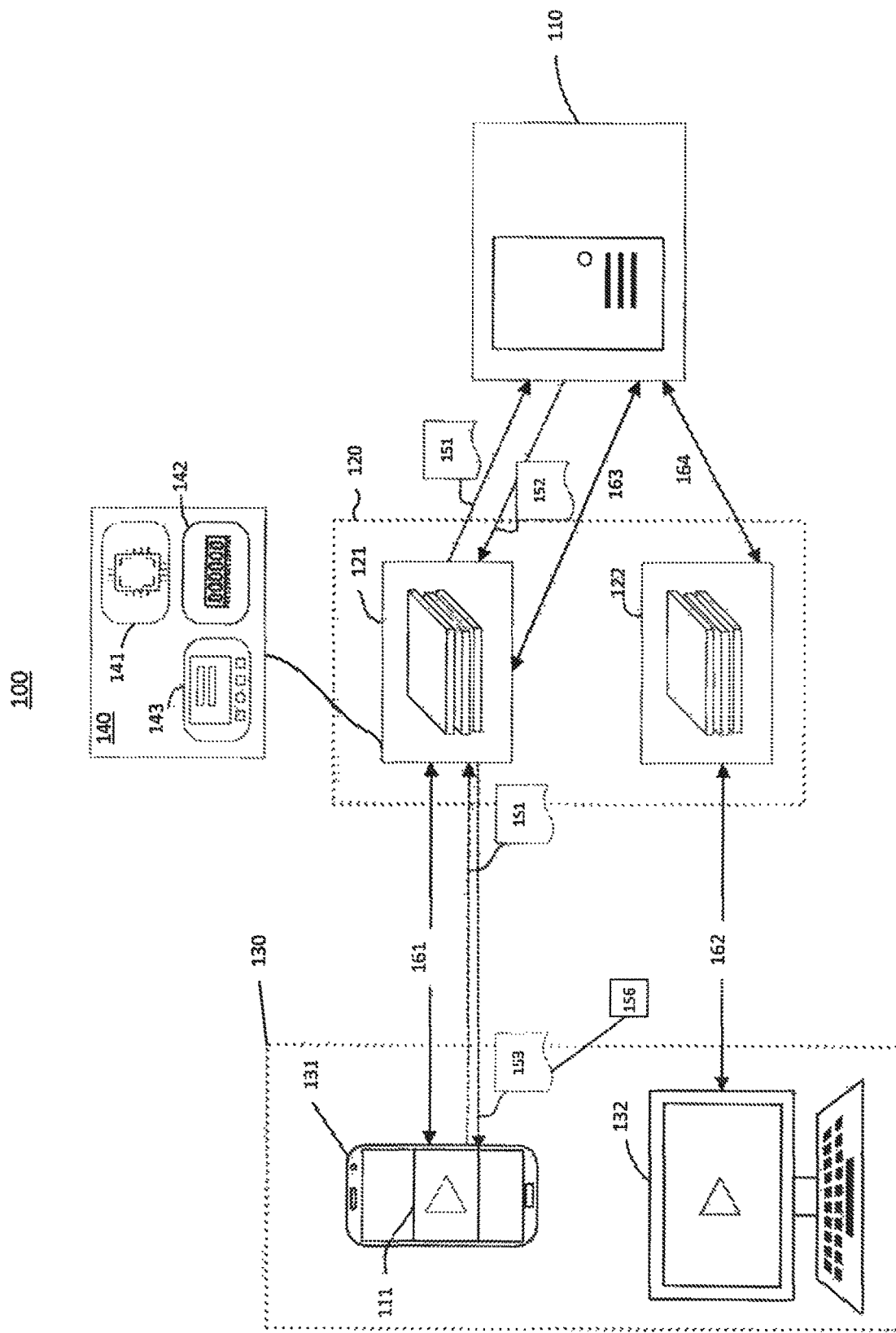

300

Session Manager 310

Just-in-time (JIT) Packager 320

Transport Stream Resolver (TSR) 330

Advertisement (Ad) System 340

Fig. 3

| Row Number | Device ID | Last Content Segment Played Index | Last Alternative Content Segment Played Index | Content ID | Alternative Content ID | Number Of Times Played |
|---|---|---|---|---|---|---|
| 1 | f2856c06-9f19-41e4-8351-e4b6f9133c1f | 1 | 0 | c586 | a546 | 1 |
| 2 | 38c0d4b5-d2b9-49f3-b54a-6e04cb2d9765 | 10 | 1 | 41e4 | d2b9 | 5 |
| 3 | c2dfac76-c586-45a0-b1fa-d1b68a7fddd2 | 4 | 0 | a546 | 822c | 8 |
| 4 | ef31bcb0-4c88-492f-a54b-7bb07f3552a8 | 2 | 10 | cbe0 | b1fa | 11 |
| 5 | f2856c06-9f19-41e4-8351-e4b6f9133c1f | 67 | 3 | 4c88 | 37c5 | 3 |
| 6 | 4d36a5e0-cbe0-4b41-9b74-2774a5f1a6a0 | 24 | 0 | b1fa | b54a | 1 |
| 7 | 71642a0-822c-4515-9998-b88840722061 | 56 | 2 | c586 | c586 | 2 |
| 8 | 9842717-c4c1-486a-84a0-1300a1a67c98 | 78 | 6 | 9074 | d2b9 | 9 |
| 9 | 0b7becd4-6694-4ae4-9837-cc4c054b0152 | 34 | 0 | 4ae4 | 84a0 | 16 |
| 10 | f2856c06-9f19-41e4-8351-e4b6f9133c1f | 33 | 5 | 4c88 | b1fa | 7 |

Fig. 5

VIDEO DISTRIBUTION SYSTEMS AND METHODS

CROSS REFERENCE TO RELATED APPLICATIONS

This application is a continuation, and claims the benefit of priority, of U.S. patent application Ser. No. 16/732,514, filed on Jan. 2, 2020, which is incorporated herein by reference in its entirety.

TECHNICAL FIELD

The present disclosure relates to systems and methods for distributing multimedia content, and more particularly, to systems and methods for real-time server-side selection of content while distributing the multimedia content.

BACKGROUND

Multimedia distributors deliver videos to subscribing viewers by streaming the videos to each playback device associated with a viewer. The distributors may split the video into smaller segments (sometimes of equal length) and may compile a manifest file with a list of identifiers to the split video segments. A viewer's device can access the streaming video for playback by requesting at various time intervals, in sequential order, access to the video segments associated with the identifiers listed in the manifest file.

Currently, some distributors generate revenue by embedding advertisements within the streaming video. In practice, a streaming video that includes advertisements may need to list segments identifying both the advertisements and the content in the pre-compiled manifest file. Because the advertisements must be pre-compiled into the manifest file together with the content, the distributors may deliver static advertisements (i.e., the advertisements that do not change from one playback to another) to its viewers. Alternatively, a non-standard version of the manifest file, with the ability to change details of the advertisements embedded in the video, can be used to update details of advertisements during playback. However, a non-standard version of the manifest file may require users to install in their devices a non-standard media player to parse the non-standard manifest file. Because of the practical difficulties associated with developing, distributing, and maintaining such a non-standard media player, the distributors generally do not use the non-standard media player. Thus, the distributors may lack the ability to change during an ongoing playback session, alter, and customize advertisements in the video they stream to their viewers.

Streaming content with advertisements over the Internet faces additional challenges. For example, advertisement-blocking software installed on viewing devices can identify in manifests sources of advertisements being embedded in streaming video and block those advertisements or otherwise interfere with their display during video playback.

The disclosed systems and methods for providing the multimedia content address one or more of the problems set forth above, as well as other problems in the field.

SUMMARY

Consistent with a disclosed embodiment, a non-transitory computer-readable medium is provided. The non-transitory computer readable medium includes instructions that, when executed by at least one processor, cause the at least one processor to perform operations for real-time selection of content to be played by a playback unit. The operations include receiving a playback request from a playback unit, including a content identifier, and providing, to the playback unit, a manifest with at least a set of content segment identifiers based on the identifier, at least some content segment identifier identifying a content segment associated with a content stream. The operations further include receiving a content segment request comprising one of the content segment identifiers, selecting a segment for playback based on the received content segment identifier, the segment determined using content selection rules, and sending the selected segments to the playback unit for playback.

Consistent with another disclosed embodiment, a method for real-time selection of content to be played by a playback unit is provided. The method includes receiving a playback request from a playback unit, including a content identifier, providing, to the playback unit, a manifest with at least a set of content segment identifiers based on the content identifier, at least some content segment identifier identifying a content segment associated with a content stream, receiving a content segment request comprising one of the content segment identifiers, selecting a segment for playback based on the received content segment identifier, the segment determined using content selection rules, and sending the selected segments to the playback unit for playback.

Consistent with another disclosed embodiment, a method for real-time selection of content to be played by a playback unit is provided. The method includes receiving a playback request from a playback unit, including a content identifier, providing, to the playback unit, a manifest with a set of content segment identifiers based on the content identifier, receiving a content segment request comprising one of the content segment identifiers, evaluating an advertisement metric for classification topics corresponding to available ad segments, selecting one of an advertisement segment or a video segment, and sending the selected advertisement segment or the video segment to the playback unit for playback.

The foregoing general description and the following detailed description are exemplary and explanatory only and are not restrictive of the claims.

BRIEF DESCRIPTION OF THE DRAWINGS

The accompanying drawings are not to scale or exhaustive. Instead, the emphasis is generally placed upon illustrating the principles of the embodiments described herein. These drawings, which are incorporated in and constitute a part of this specification, illustrate several embodiments consistent with the disclosure and, together with the detailed description, explain the principles of the disclosure. In the drawings:

FIG. 1A is an example system for real-time server-side replacement of content consistent with the disclosed embodiments.

FIG. 3 is an example block diagram of a content distribution service consistent with the disclosed embodiments.

FIG. 5 is an example snapshot of a portion of a database that a content distribution service may use to manage different content streams distributed to multiple viewing devices consistent with the disclosed embodiments.

DETAILED DESCRIPTION

Figure 1B:
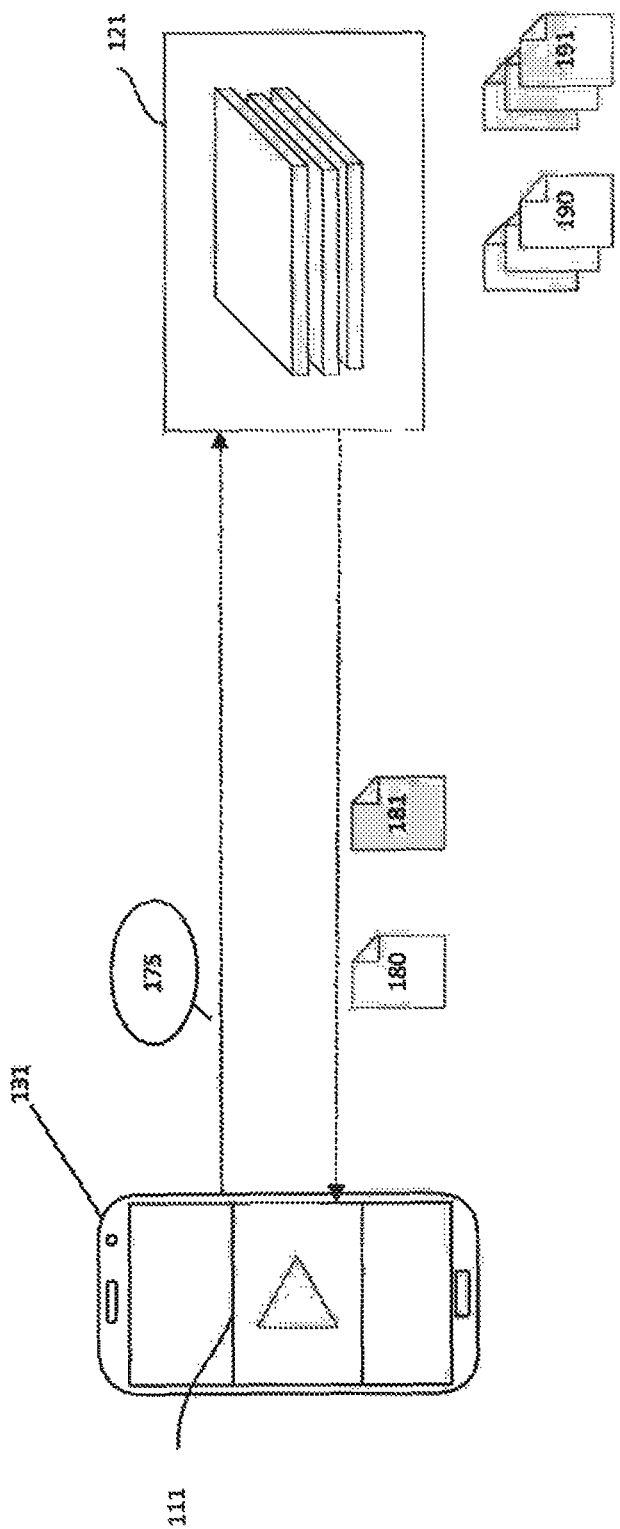
FIG. 1B is an example diagram of a user device communicating with an edge computing system consistent with the disclosed embodiments.

Viewing devices, such as computers, monitors, smartphones, and tablets, may request a streaming video from the content service provider. In various embodiments, the streaming video may be represented by video segments (herein also referred to as content segments) that may be streamed to a viewing device (herein also referred to as a user device). The streaming video is also referred to as a video stream, a content stream, or streaming content. It should be noted that while the further description may be related to video streams and video segments, aspects of the present disclosure may be equally related to any other appropriate streaming content (e.g., streaming audio). Thus, video streams and video segments are used only as examples of possible streaming content.

The video segments may have a time length $T_S$ that may be the same for different video segments or may vary from one video segment to another. An example user device may be equipped with a standard playback component (also referred to as a player), which may be implemented in software and/or hardware or combination of thereof. The player may be configured to request a segment from the content service provider and to view the streaming video (associated with the segment requests). In various embodiments, the player may be configured to request a first video segment, and while the first video segment is being played, request a second video segment. The content service provider may be configured to provide an uninterrupted experience for a user viewing the streaming video. For example, the time lengths $T_S$ for different segments may be larger than time $T_f$ required to provide a video segment to the player, in order to maintain the uninterrupted streaming experience. The content service provider may provide multiple video segments to the player of the user device, and the video segments may be played on the user device one after another. In an example embodiment, multiple video segments may include a few segments, ten segments, twenty segments, a hundred segments, a thousand segments, and the like. In various embodiments, while a video segment is being played, another segment may be requested by the player from the content service provider.

In various embodiments, the content service provider may insert other segments between the video segments of the streaming video. Such segments may include advertisements and are referred to as "ad segments" for brevity. Several ad segments may represent an advertisement, which is also referred to as an ad stream. It should be understood that other segments besides advertisement may be used (e.g., segments displaying warnings, notices, and the like), nevertheless, for brevity, the term "ad segments" may be used to denote all the inserted segments that are not part of the video requested by a user of the user device.

In various embodiments, a content service provider may determine ad segments dynamically. For example, during playback of a video segment, the content service provider may determine the ad segment that may follow the video segment. In some cases, when different devices request the same streaming video (e.g., the same movie), the ad segments for each device may be different. In some cases, the content service provider may be configured to select different video segments for different user devices, even when the video segments may be associated with the same video. For example, for some devices, some video segments (e.g., segments that show violence or are R-rated) associated with a given streaming video (e.g., a particular movie) may be omitted for some of the user devices. In some cases, the real-time server-side selection of content can also be used to provide an alternate storyline for each user viewing the streaming video. A real-time selection of segments of the streaming video may allow for a selection of different storylines for the streaming video. The videos with different storylines may be streamed to different devices or may be streamed for the same device when played at different times.

Reference will now be made in detail to exemplary embodiments discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in enough detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

A multimedia distribution system consistent with disclosed embodiments may be implemented using a computing system that is part of a content distribution network configured to distribute multimedia content such as a streaming video. FIG. 1A shows an example of a system 100, which may include a server 110, edge computing systems 120 communicatively connected to server 110, and user devices 130. For example, FIG. 1A shows an edge computing system 121 connected to a user device 131 via connection 161 and an edge computing system 122 connected to a user device 132 via connection 162. Edge computing system 121 may be connected to server 110 via connection 163, and edge computing system 122 may be connected to server 110 via connection 164. FIG. 1A also shows a multimedia distribution system 140 that may be part of edge computing system 121. System 140 may include one or more processors 141, a memory 142 for storing programming instructions, and an interface 143 for determining multimedia content and controlling various other parameters of the system 140.

In various embodiments, server 110 may include or connect to at least one database for storing multimedia content, and any other relevant data related to the distribution of content by server 110. For example, and without limitation, server 110 may also store profile data used to authenticate each user and also usage history detailing content viewing history for each user, as well as demographics and other information identifying the user's personality. Server 110 may include at least one processor configured to execute software and to perform various operations, such as receiving communication data from edge computing systems 120, analyzing the communication data (e.g., determining what type of multimedia content is being requested by a user device), determining the multimedia content that needs to be served in response to the request, and transmitting the determined content to one or more edge computing systems. In some cases, some of the above operations may be performed by an edge computing system (e.g., edge computing system 121). FIG. 1A shows, for example, a content playback request 151 communicated to server 110 via edge computing system 121 from a player 111 of user device 131. Based on request 151, server 110 may send requested content and/or other data 152 to edge computing system 121, as shown in FIG. 1A. Edge computing systems 121 may process data 152 in any suitable way (e.g., break data 152 into segments, encrypt data 152, re-encode video data 152, place watermark in data 152, and the like) and transmit data 153 to user device 131. Data 153 may include segments of data 152 and any other data 152 related information.

In various embodiments, request 151 may include user or user device identification information (e.g., device information, device location, account-related information or user-related information, such as the language of the user, age of the user, gender of the user, nationality of the user, and the like). Such information may be used for determining ad segments for a user device (e.g., device 131), or determine changes to the streaming video segments (e.g., omitting violent content in the streaming video). In some cases, account-related information may include a user profile. In some cases, the user profile may be used in determining the ad segments, as further explained below.

Request 151 may cause server 110 to provide player 111 a manifest file 156, which may be part of the data 153. Manifest file 156 may contain identifiers to the video segments of the requested streaming video content, as well as identifiers (e.g., Internet addresses) to ad segments. In some cases, after receiving manifest file 156, player 111 of user device 131 may communicate with edge computing system 121 and request various video segments as listed in the manifest file 156. For instance, FIG. 1B depicts an example diagram that shows player 111 of user device 131 communicating with edge computing system 121. In an example embodiment, player 111 of user device 131 may send a request 175 for a video segment 180, as shown in FIG. 1B that may be one of video segments 190 from manifest file 156, as shown in FIG. 1A. Edge computing system 121 may obtain video segments 190 from a server (e.g., system 121 may receive a video segment from server 110, as shown in FIG. 1A) and may further obtain one or more ad segments 191. Edge computing system 121 then may return a, in response to player 111 request for a video segment, video segment 180 followed by one of the ad segments (an ad segment 181) from segments 191 to player 111. Alternatively, system 121 may first return in response to player 111 request for a video segment, ad segment 181, followed by video segment 180. In some cases, when player 111 requests segment 180, server 121 may return in response to player 111 request. segment 180, or segment 181. Segments 180 or 181 may be selected based on an algorithm for selecting segments, as discussed below. Further details of the operation of edge computing system 121 are described below. In some cases, system 121 may obtain ad segments 191 before transmitting video segments 190, and in some other cases, only a few ad segments 191 may be initially obtained, and other ad segments may be obtained during playback of video segment 180 by player 111.

Figure 2:
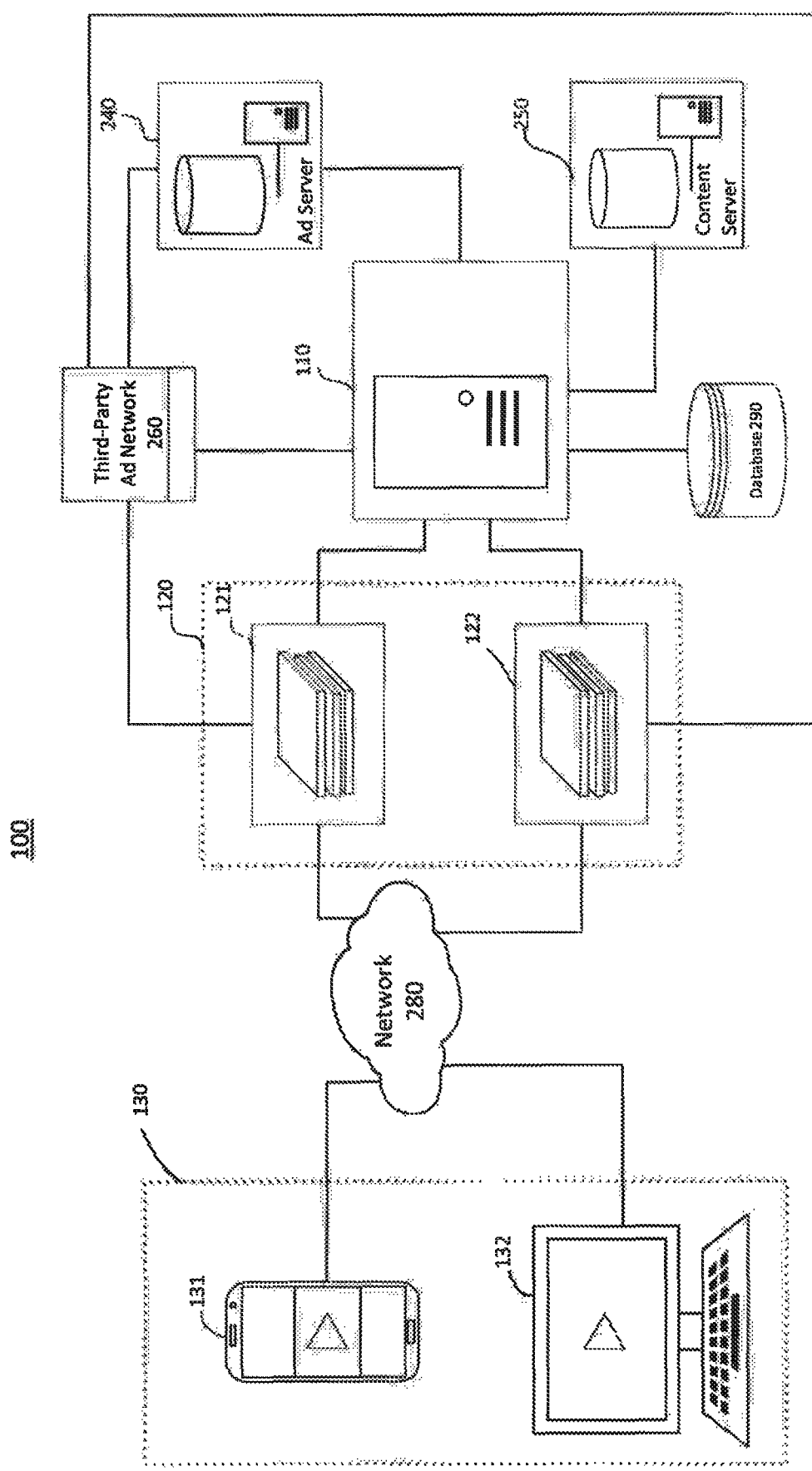
FIG. 2 is an example network system for content replacement consistent with the disclosed embodiments.

FIG. 2 shows further details of an example network system 100 for selecting video and ad segments consistent with the disclosed embodiments. System 100 may be, for example, a content delivery network and have multiple servers (e.g., servers 240, 250, and 110 and edge computing systems 121 and 122, as shown in FIG. 2). A representative server (e.g., server 110) may be connected to one or more other servers with access to different types of content. Server 110 may respond to content requests from user devices 130 by communicating with the one or more connected servers and databases to retrieve the requested content. In some embodiments, server 110 may include locally stored content.

As shown in FIG. 2, server 110 may be connected to advertisement (ad) server 240 and content server 250 to access advertisements and content (e.g., video content) independently. In other embodiments, advertisements and content may be stored together on a single server (e.g., server 250) or on a single system of connected servers (e.g., a system of servers 240 and 250).

Server 110 may also be connected to a third-party ad network 260. Third-party ad network 260 may contain advertisements that may be represented by appropriate ad segments. These ad segments may be requested by server 110 (or may be provided to server 110 by network 260) and may be inserted between video segments (e.g., segments 190, as shown in FIG. 1B) for a streaming video requested by a user of a user device (e.g., device 131). The ad segments (e.g., segments 191, as shown in FIG. 1B) and video segments 190 (that may be located at content server 250) may then be transmitted to various user devices using server 110 and an edge computing system (e.g., edge computing system 121).

In various embodiments, the third-party ad network 260 may use a variety of processes to determine advertisements, such as a bidding process where advertisers bid against each other for the opportunity to distribute their advertisements. Server 110 may also restrict advertisements identified through the bidding process for certain types of content requests. For example, server 110 may only use third-party ad network 260 to identify advertisements when determining the content to be played farther in the future by the user devices 130. Such a restriction may help avoid delays in responding to content requests to be viewed immediately on the user devices 130. For example, if it takes at least $T_{FA}$ time to identify and obtain a third-party advertisement, ad segments related to the third-party advertisement may be inserted between video segments 190 that may be played by the player at a future point in time. The future point in time may be more than $T_{FA}$ time away from the point in time when a process of identification and obtaining the third-party advertisement begins.

In some embodiments, server 110 may handle various aspects of a response to content playback request 151, as shown in FIG. 1A, and in other cases, server 110 may delegate at least some of the aspects of the response to request 151 to the one or more of the connected servers (e.g., servers 250 or 240) or to edge computing systems 120. As shown in FIG. 2, server 110, and ad server 240 may be both connected to third-party ad network 260. The server 110 may directly communicate with the third-party ad network 260 or may request ad server 240 to communicate with the third-party ad network 260 to retrieve advertisement(s) to respond to a content request by user devices 130.

User devices 130 may enable users to communicate directly or indirectly with various components of system 100. User devices 130 may be connected to the various components of the system 100 through network 280. Network 280 can be a wired or wireless network or both. For example, as shown in FIG. 2, user devices 130 are connected to edge computing systems 120. In some embodiments, server 110 may host at least some of the content requested by user devices 130 on edge computing system 120, besides hosting content on at least one database 290, ad server 240, or content server 250. The edge computing system 120 may act as a cache for faster delivery of content requested by the user devices 130.

In some embodiments, a user device (e.g., device 131) may interact with edge computing system 121 and various servers (e.g., server 110). For example, during an initial request for a streaming video (e.g., request 151, as shown in FIG. 1A), user device 131 may submit the request to server 110. Server 110 may transmit to edge computing system 121 video segments 190, as shown in FIG. 1B, corresponding to the requested streaming video. In some cases, server 110 may request content server 250 to transmit video segments 190, and in other cases, server 110 may be configured to obtain video segments 190 from database 290, and transmit them to edge computing system 121. In some cases, server 110 may be configured to transmit profile information related to a user account associated with user device 131 to edge computing system 121. Subsequently, edge computing system 121 may interact directly with either third-party ad network 260 or ad server 240 to obtain ad segments 191, as shown in FIG. 1B that may be inserted between video segments 190, as shown in FIG. 1B. In various embodiments, media distribution system 140, as shown in FIG. 1A, may be used to facilitate the acquisition of the ad segments 190. In an example embodiment, different components of system 100 may be used for the selection process of ad segments 191. For example, system 121 may be used to determine ad segments 191 that are tailored for a given user account or for a given device, while server 110 or/and ad server 240 may be used to locate default ad segments for cases when system 121 fails to obtain the tailored ad segments 191. In various embodiments, edge computing system 121 may communicate with server 110 and/or ad server 240 to request default ad segments, when system 121 fails to obtain the tailored ad segments 191. In some cases, edge computing system 121 may determine a first set of ad segments 191, and server 110 may determine a second set of ad segments 191. Alternatively, server 110 may provide updated ad segments to system 121 based on various kinds of information collected by server 110) (e.g., server 110 may collect information about what advertisements are popular at a time when player 111 is requesting a streaming video).

Server 110 (or an edge computing system such as system 121) may select what type of a segment to transmit to player 111, as shown in FIG. 1B, of user device 131. In some cases, server 110) (system 121) may determine that a video segment (e.g., segment 180, as shown in FIG. 1B) may need to be transmitted, in response to a request, to player 111, and in other cases, server 110 may determine that an ad segment may need to be transmitted to player 111. In some cases, server 110 (system 121) may transmit a video segment followed by another video segment, and in other cases, server 110 (system 121) may transmit a video segment followed by an ad segment. Server 110 (system 121) may select the type of a segment (i.e., whether the segment is a video segment or an ad segment) based on the availability of ad segments. Server 110 (system 121) may initially check for ad segments 191 (as shown in FIG. 1B) in database 290, and also request ad segments 191 from ad server 240. In some embodiments, the request for ad segments 191 may also be sent to third-party ad network 260 to determine if there are ad segments that can generate larger revenue for a content service provider. Server 110 (system 121) may then make the selection between the available video segments and available ad segments, where the ad segments may be related to the identified advertisements from at least one of database 290, and/or ad server 240, and/or the third-party ad network 260. Server 110 (system 121) may then provide player 111 with the selected segment. In some embodiments, ad server 240 may select ad segments related to at least one identified advertisement, and server 110 may make a final selection between the video segments and ad segments selected by the ad server 240. In various embodiments, an advertisement may consist of multiple ad segments, and server 110 or system 121 may be configured to transmit all the ad segments for the advertisement until the advertisement is transmitted in its entirety. After transmitting the advertisement, server 110 or system 121 may resume the transmission of a video (composed of video segments) at a position where the video was interrupted by the advertisement, or at a new position (e.g., if a user has requested a seek during playout of the advertisement). For example, server 110 (system 121) may select a first set of video segments having one or more video segments and transmit these video segments to player 111 following player 111 requests for video content. The last segment in such first set of video segments may be identified as a finishing video segment. After transmitting the first set of video segments, server 110 (system 121) may select one or more advertisement segments (in response to a request from player 111 for video content) comprising an entirety of an advertisement. After transmitting the advertisement, server 110 (system 121) may select a second set of video segments, having a staring video segment. The starting video segment may be the first video segment of the second set of video segments. In various embodiments, the starting video segment may follow logically the finishing video segment (e.g., if video segments are segments of a movie, the starting video segment may be a continuation of the movie following the finishing video segment).

In various embodiments, server 110 may provide a manifest file (e.g., manifest file 156, as shown in FIG. 1A) with a combination of content identifiers such as links pointing to edge computing system 121 and/or server 110, and/or other servers and/or database 290. Server 110, and/or system 121 may determine the number of ad segments and/or durations of ad segments that may be inserted between video segments. In some embodiments, server 110 or system 121 may generate manifest file 156 with a total number of generic segment identifiers matching the combined number of video segments and ad segments. The segment identifiers may be any unique identifiers (e.g., alphanumeric identifiers, identifiers with special characters, etc.) that can be used to identify a content segment. In some cases, the segment identifiers may include links (e.g., URL links). In some cases, server 110 or system 121 may be configured to omit transmitting some or all of the ad segments listed in manifest file 156. For example, server 110 (system 121) may skip some of the ad segments by transmitting to player 111 (as shown in FIG. 1B) an empty segment for some of the requests for video segments (e.g., requests 175, as shown in FIG. 1B). In some other embodiments, server 110 (system 121) may skip one or more ad segments by associating an empty segment with one of the generic segment identifiers. The empty segments may be located at the end of the list of identifiers in manifest file 156. An empty content segment may be a blank video of zero length and may not be detectable by a user viewing a streaming video corresponding to the video segments listed in manifest file 156.

Alternatively, when player 111 request a particular segment of manifest file 156 (as shown in FIG. 1A), server 110 (system 121) may be configured to choose an ad segment or a video segment. In some cases, as previously described, server 110 (system 121) may choose to select several ad segments in a row in response to player 111 (as shown in FIG. 1B) request for a video segment, in order to complete an advertisement formed from the several ad segments. The above approach may allow server 110 (system 121) to select at playback time when to insert an advertisement or an emergency message. For example, in some cases, the advertisement may be inserted in response to an event (e.g., a release of a new book or a video game), and an emergency message may be inserted in response to an emergency event (e.g., approaching forest fire). Alternatively, some of the segments of manifest file 156 may be reserved for transmitting ad segments to player 111. Once these segments are requested by player 111, server 110 (system 121) may select an appropriate ad segment. For such a case, the position of ad segments during the playback may be predetermined in manifest file 156 (shown in FIG. 1A), but the selection of advertisement may change from one playback to another.

In various cases, an association between segment identifiers listed in manifest file 156 and segments of content for playback may be conducted at a playtime (i.e., during playback of the segments of content). For example, while playing a segment of content, player 111 may request a next segment of the content, and server 110 (system 121) may select either an ad segment or a video segment to be transmitted to player 111.

Player 111 (as shown in FIG. 1B) may be configured to receive manifest file 156 (shown in FIG. 1A) and determine the total amount of time needed for a user to watch tie requested streaming video. By providing player 111 with accurate information about the number of ad segments and duration of the ad segments, player 111 may correctly determine the time duration of the streaming video. In various embodiments, the location of ad segments within the streaming video may not be predetermined and may change depending on the user skipping a portion of the streaming video. For example, if the user skipped a first portion of the streaming video by skipping forward (i.e., skipping from a first time position to a second time position of the video, the second time position being at a later time than the first time position), server 110 (system 121) may be configured to place all ad segments that are selected for the streaming video, in a remaining portion of the streaming video that is not skipped by the user. While in some embodiments, some restrictions may be used to prevent user skipping ad segments, in other embodiments, skipping ad segments may be allowed.

In some cases, the user may rewind the streaming video by skipping backward (i.e., skipping from a second time position to a first time position of the video, the second time position being at a later time than the first time position) a first portion of the video and watching again the first portion. For such cases, server 110 (system 121) may be configured to select new ad segments to be inserted between video segments related to the first portion of the video, where the new ad segments may be different from ad segments that were previously watched by the user. The selection of new ad segments by server 110 (system 121) may facilitate obtaining larger advertisement revenue by a content service provider. It should be noted that the above-described selection of ad segments is only illustrative, and server 110 (system 121) may determine ad segments in any suitable way. In an example embodiment, server 110 (system 121) may skip ad segments for a previously watched video content. In some embodiments, server 110 (system 121) may determine ad segments, the number of ad segments, and durations of the ad segments based on the streaming video. For example, a streaming video related to a documentary about climate change may not include an advertisement for air travel to a remote island.

In various embodiments, ad segments provided by server 110 (system 121) may not rely on content delivery network caching (also referred to as standard CDN caching). Standard CDN caching may return, in response to player 111 (shown in FIG. 1B) request for content, the same ad segments as was previously transmitted to player 111 during previous playbacks, since these ad segments will be available in the standard CDN cache. In order to return different ad segments during different playbacks of the content, identifiers URL links) in manifest file 156 may point to content residing on server 110 (system 121) or on an associated database. Upon a request for content from player 111, server 110 (system 121) may determine what ad segments were transmitted to player 111 during previous playbacks and may select the same or different ad segments for subsequent playbacks.

FIG. 3 is an illustrative block diagram of a multimedia distribution service consistent with the disclosed embodiments. A media distribution service 300 is a collection of software components that aid in determining and distributing streaming content to user devices. Server 110 (shown, for example, in FIG. 2) may include components of media distribution service 300. In some embodiments, one or more of the components may be residing in edge computing systems 120 (shown, for example, in FIG. 2). In some cases, components of service 300 may be part of system 140 (shown in FIG. 1A).

A session manager 310 may manage a session of streaming content such as video streaming. Session manager 310 may process request 151, as shown in FIG. 1A, and may initiate the streaming session. In an example embodiment, session manager 310 may analyze a request 151 and may determine the information that may be contained in request 151. For example, session manager 310 may determine the title of a movie that a user is requesting for playback. In addition, request 151 may include information about user device 131 (shown in FIG. 1A), such as, for example, an identification number of device 131 or account information associated with device 131. In some cases, session manager 310 may determine if user device 131 is authorized to receive the streaming video. For instance, session manager 310 may request a payment from user device 131, and upon receiving the payment, authorize device 131 to receive the streaming video. In some cases, to identify device 131, session manager 310 may generate a unique device identifier (e.g., identification (ID)) associated with device 131. Such a generated device ID may be used for facilitating communication between device 131 and service 300. For example, the generated device ID may be used as a part of a name of manifest file 156 (shown in FIG. 1A) for device 131. In some cases, the device ID may be based on account information associated with device 131 and a MAC address of device 131.

In an example embodiment, service 300 may include a Just-in-time (JIT) packager 320 that may be used to prepare manifest file 156 (shown in FIG. 1A) containing one or more identifiers to video segments 190, as shown in FIG. 1B. In some embodiments, manifest file 156 may be static and reside on an edge computing system (e.g., system 121, as shown in FIG. 1A). JIT packager 320 may request system 121 (shown in FIG. 1A) to transfer manifest file 156 to player 111 (shown in FIG. 1B). In some other embodiments, server 110 or system 121 may first check for the existence of manifest file 156 (shown in FIG. 1A) prepared for a streaming video. In cases when manifest file 156 is missing, JIT packager 320 may be configured to prepare manifest file 156.

JIT packager 320 may include a specialized manifest generator module for preparing manifest file 156. JIT packager 320 may be also used to repackage video for various formats. For example, when video segment 180 is requested by player 111, JIT packager 320 may determine a resolution for video segment 180 and convert a corresponding video segment available in database 290 to video segment 180 having the required resolution. In some embodiments, when player 111 prefers a particular video format (e.g., Apple Quicktime), JIT packager 320 may convert a corresponding video segment available in database 290 to video segment 180 having the required video format.

As shown in FIG. 3, media distribution service 300 may include a transport stream resolver (TSR) 330 that may receive request 175, for a video segment, as shown in FIG. 1B, and provide player 111 (shown in FIG. 1B) with either a video segment (e.g., video segment 180, as shown in FIG. 1B) or an ad segment 181 (e.g., ad segment 181, as shown in FIG. 1B). In an example embodiment, player 111 may receive manifest file 156 (shown in FIG. 1A) and send request 175 to TSR 330 for video segment 180, based on identifiers present in manifest file 156. For example, an identifier such as a link from manifest file 156 may be linked to a video segment that needs to be transmitted to player 111. In some cases, manifest file 156 may contain information, other than links to video segments, that can be used to identify video segments. For example, manifest file 156 may contain a list of data records with each record indicating a video segment starting time, a video segment ending time, and an Internet address for locating the video content.

In various embodiments, request 175 (shown in FIG. 1B) for video segment 180 (shown in FIG. 1B) may contain information about the identifier to segment 180, where the identifier is obtained from manifest file 156 (shown in FIG. 1A). TSR 330 may receive request 175, analyze the information contained in request 175, and determine which video segment is requested by player 111 (shown in FIG. 1B). For example, TSR 330 may analyze request 175 and determine a starting and an ending time for video segment 180 requested by player 111. Once TSR 330 identifies the video segment that needs to be transmitted to player 111, TSR 330 may generate an identifier to the identified video segment. Alternatively, TSR 330 may generate an identifier to an ad segment that may be used instead of the video segment requested by player 111. In an example embodiment, TSR 330 may retrieve the video segment or the ad segment associated with the generated identifier and transmit the data corresponding to the retrieved segment to player 111 for playback.

In some cases, TSR 330 may obtain request 175 (shown in FIG. 1B) and be configured to determine if an ad segment is needed to be transmitted to player 111 (shown in FIG. 1B). For instance, an ad segment may be transmitted to player 111 by TSR 330 after a user watched the streaming video for a selected duration of time. For example, an ad segment may be transmitted to player 111 after the user watched a few minutes, ten minutes, fifteen minutes, twenty minutes, and the like of the streaming video. In some cases, an ad segment may be transmitted after a particular video segment. For example, an ad segment may be transmitted after a suspenseful video segment.

In some cases, when TSR 330 determines that an ad segment needs to be transmitted to player 111, TSR 330 may communicate with ad server 240 to identify an identifier to the ad segment. Alternatively, when TSR 330 determines that a video segment needs to be transmitted to player 111, TSR 330 may communicate with content server 250 to identify an identifier to the video segment.

Alternatively, TSR 330 may be configured to receive identifiers to an ad segment from ad server 240 (shown in FIG. 2) and a identifier to a video segment from the content server 250 (shown in FIG. 2), and after receiving the identifiers, make the selection of which segment to use to transmit to player 111 (shown in FIG. 1B). Selecting whether to use the ad segment or the video segment may depend on the previously played ad segment or the video segment. In various embodiments, TSR 330 may access the ad segment and the video segment by retrieving segments from database 290 (shown in FIG. 2).

In some embodiments, TSR 330 may maintain a mapping between a list of generic video segment identifiers (shared in a manifest file) and specific video segment identifiers and ad segment identifiers. TSR 330 may prepare the mapping before receiving any requests for the video segments. In some embodiments, TSR 330 may share one or more map entries between users, making similar requests for the video segments. Sharing the mapping may depend on the user profiles, content type, geographic location of the request, and the like. In some other embodiments, the TSR 330 may maintain multiple groups of mappings between the generic segment identifiers and actual content and advertisements based on various categories (e.g., user age group, content rating, geographic locations, and the like). For example, two users watching a PG-13-rated movie may not see content with alcohol-related advertisements, irrespective of the age of the users. In yet some other embodiments, the mapping between the generic and specific identifiers may exist for a certain period and may show the same resultant content or advertisements for similar content segment requests for that period.

In various embodiments, TSR 330 may be protocol-agnostic (works with both TCP ad UDP streams) and is not constrained by the multimedia encoding technique (e.g., H.264 or MPEG-4, etc.). TSR 330 agnostic nature may be compatible with all the existing multimedia content players (e.g., Apple Quicktime, Windows Media Player, VLC Player, and the like) installed on user devices 130. TSR 330 may interact with HP packager 320 for converting a video segment available in database 290 to a required format as previously described.

As shown in FIG. 3, media distribution service 300 may include an advertisement (ad) system 340. System 340 may receive a request from TSR 330 when TSR 330 determines that an ad segment needs to be transmitted to player 111. Upon receiving a request from TSR 330, ad system 340 may communicate with ad server 240 (shown in FIG. 2) to retrieve an ad segment. In some embodiments, ad system 340 may coordinate with ad server 240 by sharing preferences for the ad segment based on a variety of factors (e.g., preference based on information available from a profile associated with a user's account, preferences associated with financial profits from different ad segments, or combination of thereof). In an example embodiment, an ad server 240 may retrieve ad segments from a connected database selected based on various preferences as further described below.

In some cases, as noted above, TSR 330 may select to transmit a video segment to player 111 (shown in FIG. 1B). TSR 330 may make such a determination based on the length of an ad segment previously transmitted to player 111 and/or revenue generated from the ad segment. In some cases, TSR 330 may communicate a transmission history of segments to ad system 340. Ad system 340 may keep a report of various ad segments previously transmitted to player 111. The reports may be used to determine the amount of revenue generated per specific content and content author. Such reports may help with billing purposes. In some embodiments, such reports may be used to learn which advertisements were determined and under what conditions and update the rules to increase advertisement revenue and improve user experience. The report may include the number of times an ad segment was transmitted to player 111, types of ads transmitted to player 111, a sequence of ad segments transmitted to player 111, and the like.

Figure 4:
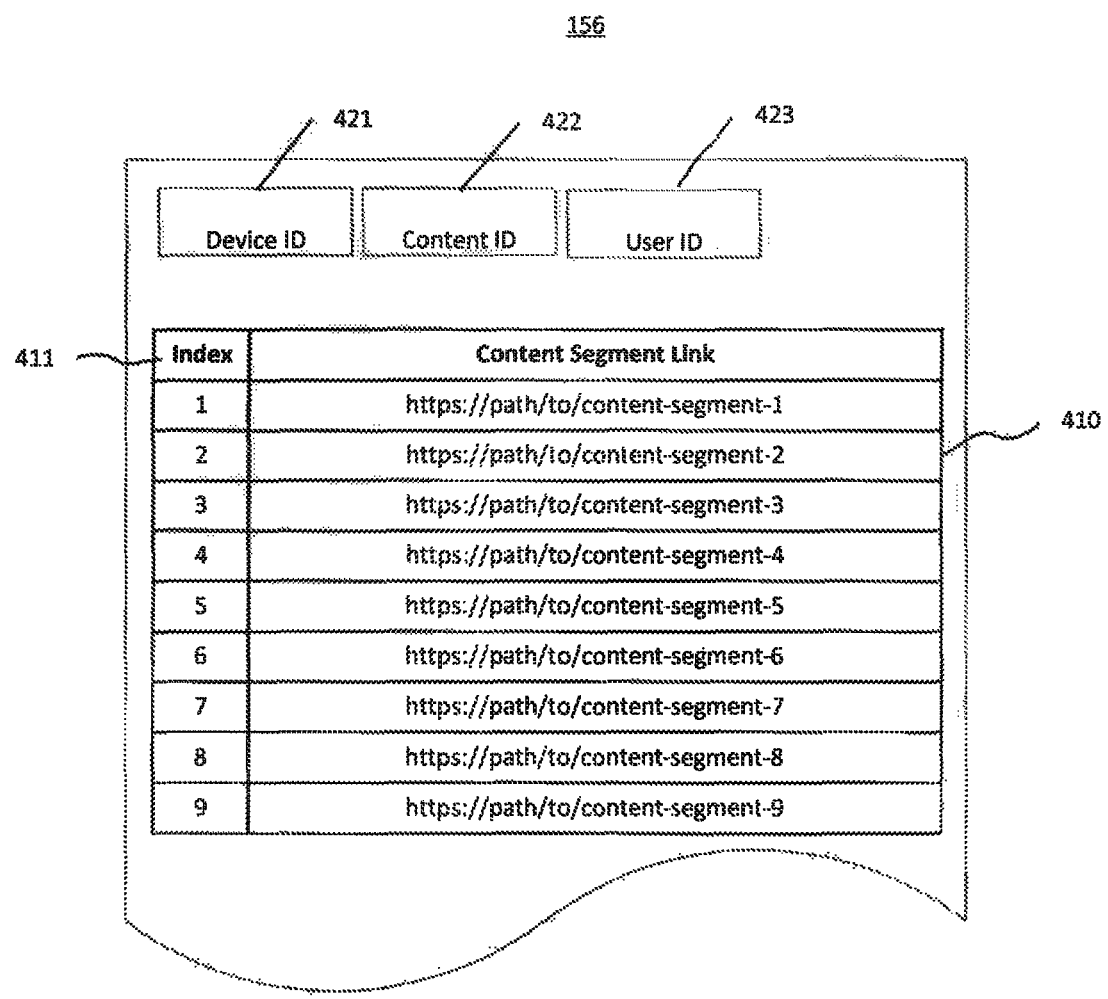
FIG. 4 is an example diagram describing the contents of a manifest file that viewing devices use to request content from a content distribution service consistent with the disclosed embodiments.

FIG. 4 is an illustrative diagram describing the contents of manifest file 156 (shown in FIG. 1A). In an example embodiment, manifest file 156 may use a table data structure to list video segment identifiers 410 of a video stream requested for playback by a user device (e.g., user device 131, as shown in FIG. 1A). Segment identifiers 410 (e.g., uniform resource locators (URLs)) may point to a physical location of some video segments, and an index column 411 may identify an index associated with the video segment. In some embodiments, manifest file 156 may be an XML or JSON formatted file. Manifest file 156 may include additional information identifying the user device and a requested content stream. For example, in FIG. 4, manifest file 156 may include a device identification number (device ID) 421 identifying the user device (e.g., user device 131 or 132, as shown in FIG. 1A), a content identification number (content ID) 422 identifying the content stream, and a user identification numb (user ID) 423 associated with an account of a user of the user device.

Video segment identifiers may incorporate numbers 421, 422, and 423 into their names. For example, video segment identifier 410 may be referenced by a name string "https://path/to/content-segment-2/name-421-422-423" or any other suitable name string that may include numbers 421, 422, and 422. The name string may be generated by edge computing system 120 when returning manifest 151 to device 131. In various embodiments, portion "https://path/to/content-segment-2/" may be used to locate and retrieve video segment identifier 410, and portion "name-421-422-423" may be used to transmit information about video segment identifier 410. When player 111 of device 131 submits request 175, as shown in FIG. 1B, to TSR 330 (as described above), for a video segment identified by identifier 410, TSR 330 may parse the name string of identifier 410 and extract numbers 421, 422, and 423. After extracting Device ID 421, Content ID 422, and User ID 423, TSR 330 may use the extracted information to determine whether video segment identifiers 410 needs to be substituted and what ad segment should be used for the substitution.

In some cases, numbers 421, 422, and 423 may be obfuscated in the name string for video segment identifier 410 in order to protect the privacy of a user and/or a user device characterized by these numbers. Numbers 421-423 may be obfuscated in any suitable way. For example, numbers 421-423 may be encrypted and not readable by a party that does not have decryption privileges.

Upon receiving a request for playback of a video stream, server 110 (shown in FIG. 1A) identifies video segments that represent the video stream requested for playback by user device 131 (shown in FIG. 1A). Server 110 may receive a unique identifier for the video stream (e.g., a URL of the video stream, and the like) used to lock up the video segments. Server 110 may populate manifest file 156 (shown in FIG. 1A) with the locations (e.g., URLs of the video segments) of all the identified video segments. In some embodiments, server 110 may delegate the preparation of manifest file to edge computing system 121 (shown in FIG. 1A). Edge computing system 121 may modify data of the manifest file by including additional identifiers (e.g., additional video segments or additional ad segments inserted between various video segments). In some cases, edge computing system 121 may generate generic identifiers for the video and ad segments. The generic identifiers may act as placeholders and may be associated. with video segments or ad segments, while player 111 (shown in FIG. 1B) is playing other video or ad segments. In some cases, server 110 or edge computing system 121 may determine the association of each generic identifier upon receiving the request 175, as shown in FIG. 1B. In some cases, server 110 or multimedia distribution system 140 of system 121, as shown in FIG. 1, may also add additional metadata information (e.g., device ID 421, content ID 422, or user ID 423, as shown in FIG. 4). Server 110 or system 140 may obtain the additional metadata information from the initial playback request 175. In some embodiments, server 110 or system 121 may establish an internal identifier for a user device (e.g., device 131, as shown in FIG. 1A) that may be different from one or more identifiers shared by player 111 of user device 131.

In various embodiments, player 111 (shown in FIG. 1B) of user device 131 (shown in FIG. 1A) may transmit device ID 421 and content ID 422 in requests 175 (shown in FIG. 1B). Device ID 421 and content ID 422 may cause TSR 330 (shown in FIG. 3) to determine the appropriate video segment to send to user device 131. For example, user device 131 that receives a first ad segment that may constitute a first part of the advertisement, may need to receive a second ad segment to complete the advertisement. For such cases, any segment request from player 111 containing device ID 421 may cause TSR 330 to select the second ad segment.

Content ID 422 may also help TSR 330 (shown in FIG. 3) to determine the content to be shared with user device 131. For example, player 111 of user device 131 (shown in FIG. 1A) may request multiple video streams. Such requests may include the same device ID 421, but different content IDs. For such cases, content ID 422 may cause TSR 330 to select a video segment corresponding to the video stream identified by content ID 422. Additionally, or alternatively, user device 131 may be behind a firewall and may show the same device ID of the gateway through which the communication occurs. If all the devices behind the firewall are playing the same content, then all the requests can have the same content ID and device ID. In such a case, user ID 423, as shown in FIG. 4, associated with an account of the user, may cause TSR 330 to determine a user device requesting the video segment and determine the appropriate video or ad segment to send to the user device.

FIG. 5 is an illustrative snapshot of a database table that server 110 or system 121 (shown in FIG. 1A) may use to manage different content streams (e.g., video streams) distributed to multiple user devices consistent with the disclosed embodiments. FIG. 5 shows an example tracker table 500 that may be used to track the content being served to one or more user devices (e.g., user device 131, as shown in FIG. 1A) by server 110. Table 500 may be stored by server 110 in database 290 (shown in FIG. 2) or locally on server 110. Tracker table 500 may include a row number 505 column, a Device ID 510 column, a last content segment played index 520 column, a last alternative content segment played index 530 column, a content ID 540 column, an alternative content ID 550 column, and a number of times alternative content ID 550 was played 560 column. In various embodiments, content ID 540 may include video segments, and alternative content ID 550 may include ad segments.

Using tracker table 500, server 110 (shown in FIG. 1A) may track identifiers of video stream requested by user device 131 (shown in FIG. 1A) and identifiers of ad streams (e.g., ad streams selected by TSR 330, as shown in FIG. 3). Tracker table 500 may list the identifiers of the video stream in a column labeled 540 (identifiers from this column are referred to as content IDs 540) and may list the identifiers of the ad stream in a column labeled 550 (identifiers from this column are referred to as content IDs 550).

In some embodiments, tracker table 500 may be updated. For example, alternative content IDS 550 corresponding to content IDs 540 may be updated. For instance, content ID "cbe0" may be initially related to content ID "b1fa", as shown in FIG. 5. For example, content ID 540 "cbe0" may correspond to the movie "Forest Gump," and alternative content ID 550 "b1fa" may correspond to a commercial for a delicious shrimp product. In an example embodiment, after updating tracker table 500, alternative content ID 550 "b1fa" may change and correspond, for example, to a commercial about ping-pong.

In some embodiments, as shown in FIG. 5, tracker table 500 may include the last video segment played index 520 that can be used by TSR 330 (shown in FIG. 3) to track the latest video segment of the video stream corresponding to content ID 540 played by player 111. In some cases, tracker table 500 may include the last ad segment played index 530, that can be used by TSR 330 to track the latest ad segment corresponding to content ID 550 played by player 111 (shown in FIG. 1A). Tracker table 500 may also include Device ID 510, as shown in FIG. 5. In some cases, content ID 550 may also include numbers shown in column 560 that may indicate a number of times content ID 550 was played by player 111. Table 500 may be used by TSR 330 (shown in FIG. 3) to keep track of ad streams selected for player 111 of user device 131 (shown in FIG. 1A). For example, TSR 330 may examine table 500 and determine that alternative content ID 550 "b1fa" (e.g., a content ID corresponding to shrimp commercial) was played 11 times by player 111 of user device 131 (with device ID 510 'ef31bc60-4c88-492f-a5467bb07f35522d, as shown in FIG. 5). TSR 330 may then use a different alternative content ID 550 (e.g., a content ID corresponding to skincare commercial) for player 111.

In various embodiments, tracker table 500 may track simultaneously multiple content streams (e.g., content ID's 'a546' and 'a7c5' as shown in FIG. 5) being played on the same device (e.g., device ID 'f2856c06-9f19-41e4-8351-e4b6f3133c1f' shown with pointers in FIG. 5). In some cases, alternative content ID 550 is not required to be an ad segment and may be a video segment. For example, row 7 of tracker table 500 content ID 540 'c586' that is followed by and alternative content ID 550 'c586' that is the same as content ID 540 corresponding to the same media content.

In some cases, the same content with content ID 540 may be transmitted to the same device (characterized by the same device ID), having several possible options for alternative content ID 550. For example, FIG. 5 shows tracker table 500 with row 5 and row 10 corresponding to device ID 'f2856c06-9f19-41e4-8351-e4b6f3133c1f' having a corresponding content ID '4c88'. However, for row 5, alternative content ID is 'a7c5' and for row 10, alternative content ID is 'b1fa'. For instance, if ID '4c88' corresponds to "Rachel Maddow Show," and content ID 'a7c5' corresponds to ad segment about snickers, then tracker table 500 indicates that in a first instance of a user watching "Rachel Maddow Show" (the instance corresponding to row 5), ad segments about snickers may be inserted between the video segments of "Rachel Maddow Show," while in a second instance of a user watching "Rachel Maddow Show" on the same device (i.e., device with ID 'f2856c06-9f19-41e4-8351-e4b6f3133c1f'), ad segments corresponding to shrimp commercial may be inserted between the video segments of "Rachel Maddow Show."

Figure 6A:
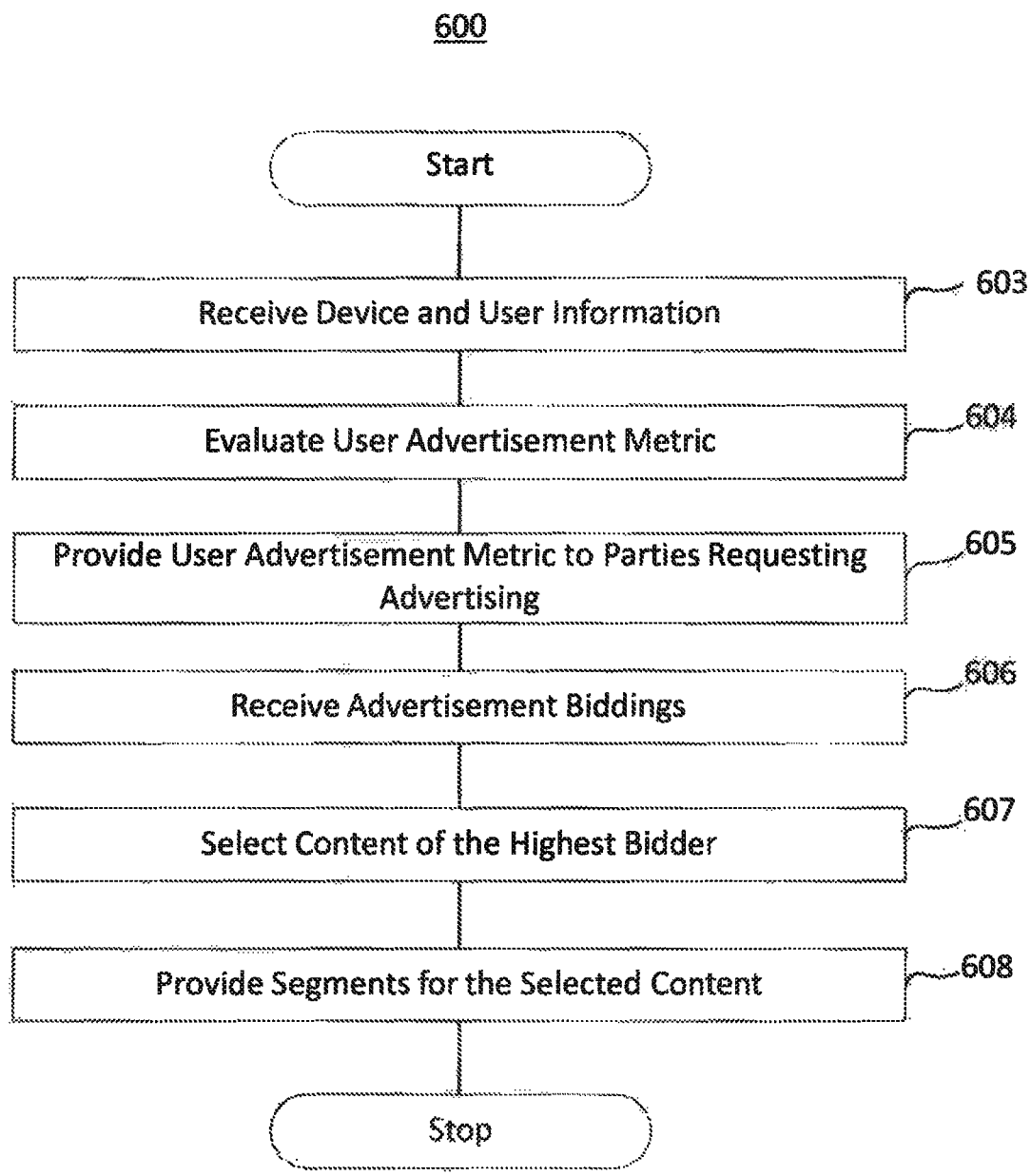
FIG. 6A is an example flowchart of a method for selecting ad segments consistent with the disclosed embodiments.

In various embodiments, TSR 330 (shown in FIG. 3) may provide ad segments tailored for a given user and may follow a set content selection rules (e.g., selection steps such as steps described below). FIG. 6A shows an example process 600 of selecting ad segments based on a set of steps 603-608. At step 603, TSR 330 may receive information about a user device (e.g., user device 131) a user account information (including information available in a user profile), as well as any other suitable information that may be used for determining the best advertisement for the user. It should be noted that TSR 330 may be configured to interact with any other suitable software and hardware elements of server 110 and/or system 121 (shown in FIG. 1A) to perform various steps of determining the best advertisement for the user. In an example embodiment, TSR 330 may request ad system 340, as shown in FIG. 3, to perform these steps.

At step 604, system 340 (shown in FIG. 3) may be configured to evaluate a user advertisement metric. In various embodiments, user advertisement metric may be a set of numbers (also referred to as scores) assigned to a given user that identify user preference for different types of advertisement. For instance, advertisements may be classified by topic (e.g., food, cars, home appliances, clothes, travel, electronics, health care products, drug, pets, and the like), by popularity among users of a given age, gender, social status, political believes, geographical location, occupation, and the like, by humorous content (e.g., funny commercials or serious commercials), by popularity when associated with a particular video stream (e.g., food commercials may be popular when users are watching the "Cupcake Wars" television show), by popularity among friends of the user, or any other suitable classification. For each classification topic, a score may be assigned for the user to identify a user's preference for such a topic. The score may have a range (e.g., 1 through 100), with "1" indicating that the user is not interested in the classification and "100" indicating that the user is very interested in the classification. For example, if the user is very interested in cars, system 340 may assign a score of 100 to a classification topic "Cars." The scores for various different classification topics may provide a user advertisement metric that may be used to select a suitable ad segment for the user.

System 340 (shown in FIG. 3) may use any suitable approaches to determine a score for the classification topic for the user. The score may be calculated by considering multiple factors (e.g., age of the user, occupation of the user, location of the user, requests for video content by the user, a social media information available about the user, links of the user to other user accounts, links of the user to other social media accounts, user Internet search history (when available), Internet or store purchases by the user, assets of the user, spending by the user, the video segment that is being watched by the user, sites visited by the user, orders requested by the user (that may or may not be completed), and the like). The multiple factors listed above may be combined in any suitable way (e.g., the factors may be combined by using a weighted average, where each factor contributes to the score using a predetermined weight).

In some cases, system 340 (shown in FIG. 3) may be configured to allow the user to skip portions of the transmitted ad segments using player 111. In some cases, system 340 may evaluate what ad segment the user is skipping to update the user advertisement metric. For example, if the user is skipping backward the ad segment (i.e., the user is watching again the ad segment), an advertisement metric score for a classification topic corresponding to the ad segment may be increased. In some cases, if the user skipped a portion of the ad segment but watched other portions of the ad segment, an advertisement metric score for a classification topic corresponding to the ad segment may be configured (by system 121) to increase. Alternatively, if the user is skipping the ad segment without watching at least a predetermined portion (e.g., a few seconds, ten seconds, twenty seconds, thirty seconds, a minute, and the like) of the ad segment, the advertisement metric score for a classification topic corresponding to the ad segment may decrease. In some cases, how quickly the user skips an ad segment may indicate user interest in the advertisement corresponding to the ad segment. In various embodiments, system 340 may request TSR 330 (shown in FIG. 3) to provide skipping options for some of the ad segment (e.g., TSR 330 may provide skipping options to ad segments corresponding to classification topics for which the certainty of a score is low), and may not allow user to skip other ad segments (e.g., ad segments corresponding to classification topics for which the certainty of the score is high). In various embodiments, system 340 may be configured to establish the certainty of the score by estimating the variance of the score. For example, the variance of the score may be estimated by calculating the average score for a group of users (e.g., all boy users between age 12-15) and calculating an average square deviation from the average score. In some cases, system 340 may use any suitable statistical approaches for estimating a score for the user for a given classification topic or estimating the certainty of the score.

In various embodiments, skipping video segments (which includes skipping one or more video segments and/or portions of video segments backward or forward) or skipping ad segments (which includes skipping one or more ad segments and/or portions of ad segments backward or forward) may affect the value of the advertisement metric for one or more ad segments for a user. A process of skipping video segments (or ad segments) from time $T_0$ by a time interval $\pm\Delta t$ may be accomplished by first determining an appropriate video frame of a video segment or an appropriate ad frame of an ad segment at a new time interval $T_0\pm\Delta t$, and then playing the video segment or the ad segment starting at the determined video or ad frame. In an example embodiment, when player 111 is configured to cache multiple video segments and. ad segments from manifest file 156, player 111 may be able to use cached video segments and/or cached ad segments for determining the appropriate video or ad frame. For example, if player 111 cached a total of five minutes of video segments, and a user is requesting to skip the video segments by two minutes forward, player 111 may be configured to determine the appropriate video frame from the cached video segments.

In various cases, the process of skipping video and ad segments may follow "skipping rules" that may be defined in manifest file 156 for cached video and ad segments. The skipping rules may be read from manifest file 156 by player 111 and, when skipping is requested by the user, player 111 may follow the skipping rules for skipping the cached video and/or ad segments. To illustrate examples of skipping rules, consider video and ad segments shown in FIG. 6B. For example, player 111 may cache segments 603 that may include a first video segment $V_1$ an ad segment $A_1$ and a second video segment $V_2$. Following Rule 1, when user request skipping by a time interval $\Delta t$ from time $T_0$ to time $T_1$, a portion of video segment $V_1$ (portion $V_{1B}$ having duration $\Delta t_1$) and a portion of ad segment $A_1$ (portion $A_{1A}$ having duration $\Delta t_2$) may be skipped, resulting in a media segment 604A containing a portion of ad segment $A_1$ (portion $A_{1B}$) and video segment $V_2$.

Figure 6B:
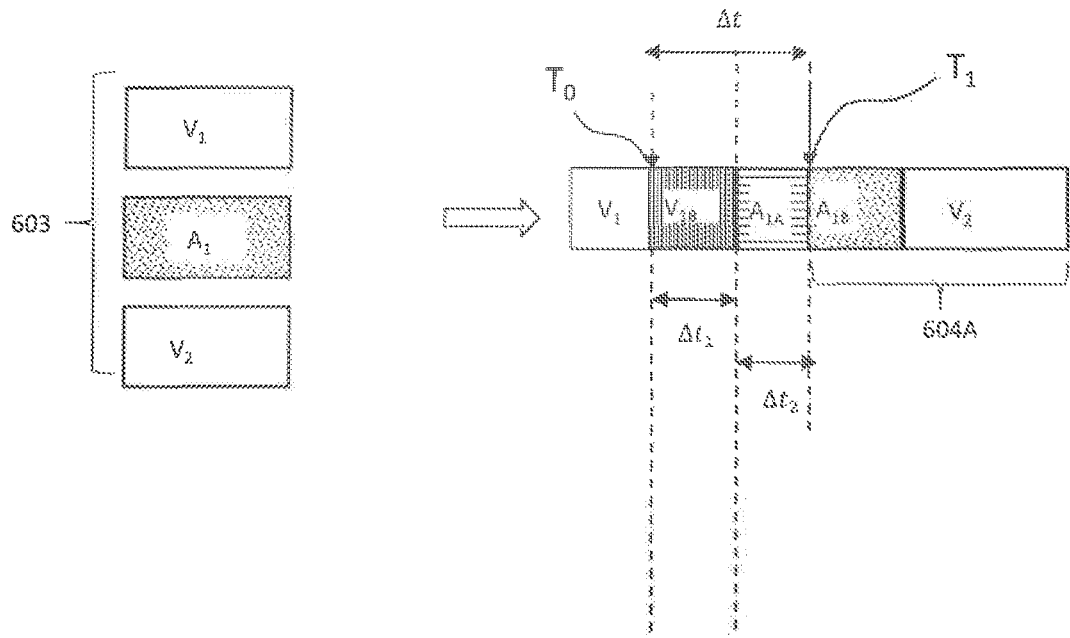
FIGS. 6B-6C shows example rules for skipping media content consistent with the disclosed embodiments.
Figure 6B:
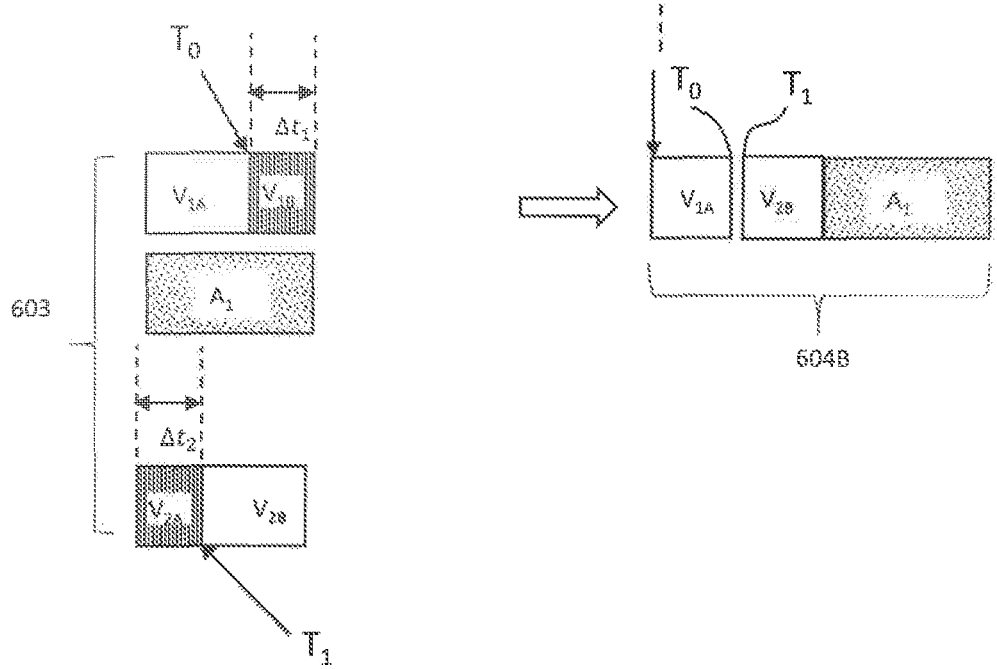
Figure 6C:
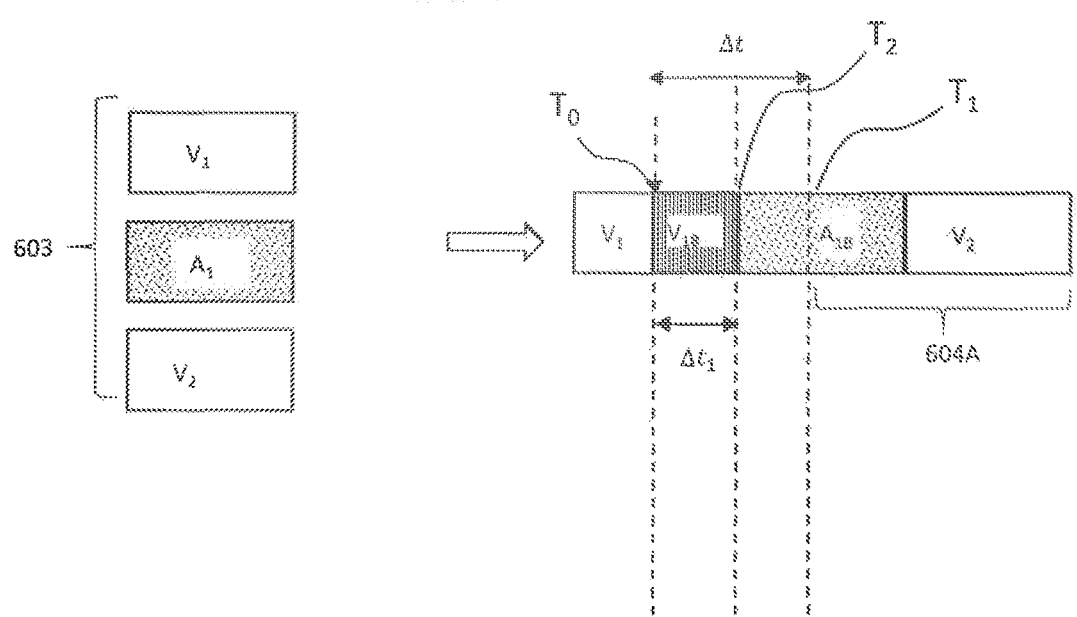

In an alternative embodiment described by Rule 2, a media segment 604B may be formed containing a portion $V_{1A}$ of video segment $V_1$ (portion $V_{1B}$ being skipped), and a portion of $V_{2B}$ of video segment $V_2$ (portion $V_{2A}$ being skipped) followed by ad segment $A_1$. Rules 1 and 2, as shown in FIG. 6B are only some of the possible examples of skipping rules, and various other rules may be used. For example, FIG. 6C shows Rule 3 that prevents skipping a portion of ad segment $A_1$. When a user request skipping a media stream by time interval $\Delta t$, Rule 3 may only allow the user to skip the media stream by the amount of time $\Delta t_1$ to prevent skipping ad segment $A_1$.

Skipping rules illustrated in FIGS. 6B and 6C are applicable for cached video and ad segments, and different skipping rules may apply for uncached segments. While skipping rules for cached segments may be communicated to player 111 via manifest file 156, skipping pales for uncached segments may be implemented by system 121 by providing player 111 with appropriate video/ad segments.

In an example embodiment, if a user is requesting to skip the video segments by a few minutes forward, player 111 may be configured to check if an appropriate video frame from the cached video segments is available, and if the video frame is not available, player 111 may be configured to request a video segment (e.g., a segment V) containing the appropriate video frame. In addition to requesting the video segment containing the appropriate video frame, player 111 may be further configured to request a few other video segments to be cached. For example, player 111 may request a few video segments prior to segment V and/or a few video segments following segment V. In some cases, player 111 may still request video segments that are being skipped for caching.

Upon receiving a request form player 111, system 121 may provide requested video segments to player 111 with additional ad segments interspersed in between the requested video segments. In some cases, when the user is requesting to skip forward an ad segment (e.g., ad segment A), system 121 may be configured to provide a substitute ad segment, which may be of the same (or similar) length as ad segment A.

Player 111 may request a set number of video segments for caching. For example, player 111 may cache the first, second, and third segment, and when it plays the third segment, may request to cache the next three video segments. Such a caching process may be referred to as sequential caching. If a skipping request is issued by a user (e.g., when player 111 is playing the first video segment, the user is requesting to skip a portion of media stream that includes, for example, the second, the third, and the fourth video segment), player 111 may be configured to request the fifth, the sixth, and the seventh video segment, following the user's skipping request. As described above, such a request by player 111 skips a request for the fourth video segment. Further, a timing of such a request by player 111 may be modified from the timing expected by system 121. Such variations in timing (and/or video segment skips) may be analyzed to identify the skipping request by the user.

Figure 6D:
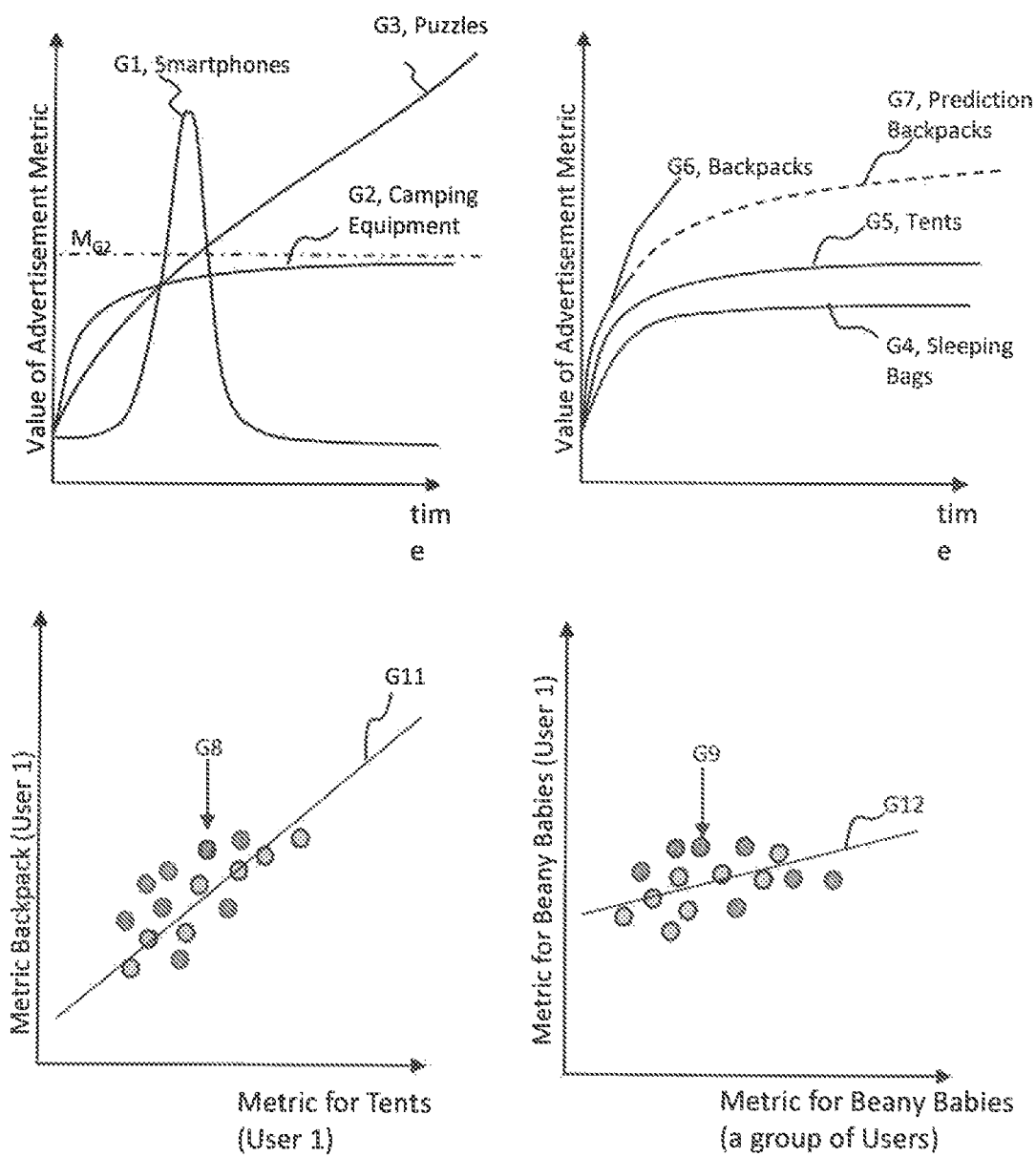
FIG. 6D shows example graphs that describe changes in an advertisement metric as a function of time or trends.

FIG. 6D shows that the advertisement metric may be changed temporarily (e.g., for a duration of multimedia playback or for a given interval of time such as one hour, a day, few days, and the like). The change in the advertisement metric may be recorded for a user by system 121, and various statistical properties for the advertisement, metric may be tracked. For example, graph G1 of FIG. 6D shows that for a given time interval (e.g., a day), a user becomes interested in advertisements related to smartphones (such interest is characterized by a peak in G1). However, G1 decreases with time, indicating that the user loses interest in smartphones. Such a decrease in G1 may be analyzed by system 121, and system 121 may reduce the number of ad segments related to smartphones for the user.

FIG. 6D also shows advertisement metric for camping equipment described by graph G2. As shown in FIG. 6D, such advertisement metric may reach a value $M_{G2}$ and system 121 may be configured to provide the user with a constant number of ad segments related to camping equipment per unit of time. Alternatively, advertisement metric may be increasing with time (e.g., metric for puzzles described by graph G3) suggesting system 121 to increase the number of ad segments relating to puzzles. Graphs G4 and G5 show example advertisement metrics for sleeping bags and tents respectively. These advertisement metrics may be determined by system 121. Additionally, system 121 may predict the time evolution of advertisement metric for backpacks (graph G7) by using data related to known advertisement metric for backpacks (graph G6) and data related to the time evolution of advertisement metric for tents and sleeping bags.

System 121 may be also configured to establish correlations between various advertisement metrics by analyzing advertisement metrics for different items. For example, system 121 may collect different data points G8 for advertising metric for backpacks and tents for different times for a given user (e.g., User 1), and establish a correlation plot G11.

In some cases, a correlation in advertisement metric may be established for a given user and a group of similar users (e.g., users of the same or similar age). For instance, if a group of kids (e.g., 4-8-year-olds) is becoming interested in Beany Babies, system 121 may be configured to collect different data points G9 for establishing a correlation plot G12 between advertising metric for Beany Babies for the 4-8-year-olds and a User 1 (e.g., a child that uses device 131). The advertisement metric for Beany Babies for the group of 4-8-year-olds may be obtained by averaging advertisement metric for various 4-8-year-olds. In various embodiments, correlation plots G11 and G12 may be used by system 121 to predict how advertisement metric for User 1 may evolve with time.

Returning to FIG. 6A, at step 605 of process 600, system 340 (shown in FIG. 3) may provide a user advertisement metric (for a given user) to third parties that are interested in delivering their advertisements to the user. System 340 may interact with third party advertisement providers via ad server 240 (shown in FIG. 2) or via third-party ad network 260, as shown in FIG. 2. The third party may be configured to receive the user advertisement metric and provide bids to system 340 (e.g., the third party may provide an amount of money they are willing to pay for their advertisements based on their analysis of the user advertisement metric).

At step 606, system 340 may receive advertisement biddings from the third parties, and at step 607, select advertisement content of the highest bidder. At step 608, system 340 may provide the selected advertisement content to TSR 330 (shown in FIG. 3).

As described above, at least some steps 603-608 may constitute the content selection rules. In some cases, however, one of steps 603-608 may provide content selection rules, and in other cases, a combination of several steps 603-608 may provide content selection rules. In an example embodiment, step 604, together with step 608, may provide content selection rules.

Alternatively, content selection rules may not follow steps 603-608. In an example embodiment, content selection rule may include choosing at least one of an advertisement segment or a video segment upon receiving request 175 for a video segment from player 111. In another example embodiment, content selection rules may include selecting a first set of video segments having a finishing video segment (i.e., a last video segment in the first set of video segments), selecting one or more advertisement segments comprising an entirety of an advertisement, and selecting a second set of video segments, having a staring video segment, wherein the starting video segment follows logically the finishing video segment.

In various embodiments, content selection rules comprise a set of decisions executed by system 121 for determining whether to provide player 111 with a video segment (e.g., segment 180, as shown in FIG. 1B) or an ad segment (e.g., segment 181, as shown in FIG. 1B) based on information obtained about a user of a user device (e.g., device 131). In various embodiments, such information may include user account information or device identifier for device 131. Various user preferences and characteristics (e.g., what type of media content is consumed by the user, the age of the user, and the like) may further influence a decision on whether to provide player 111 with video segment 180 or ad segment 181 or which ad segment 181 (or set of ad segments, e.g., ad segments 191, as shown in FIG. 1B) to provide. Further, the decision on which ad segment to provide may include evaluating a user advertisement metric as described above.

Figure 6E:
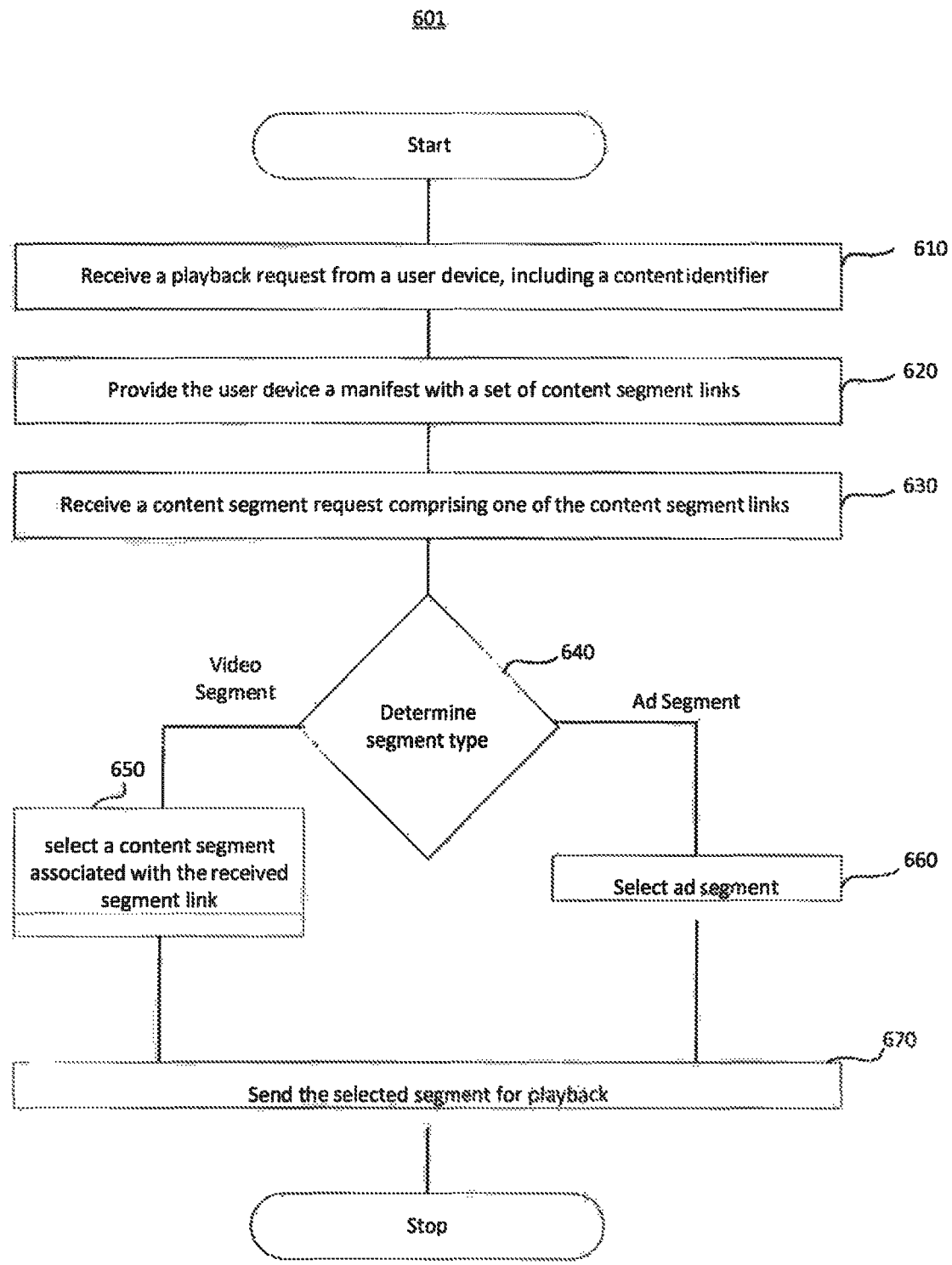
FIG. 6E is an example flowchart of a method for real-time server-side replacement of content from one source with content from another source using a set of selection rules consistent with the disclosed embodiments.

FIG. 6E is an illustrative flowchart of a method for a server-side selection of video and ad segments based on a set of selection rules consistent with the disclosed embodiments. In various embodiments, the segments may be selected while other segments are played by player 111 (shown in FIG. 1A). In some embodiments, the steps of method 600 may be performed by server 110 or system 121 (shown in FIG. 1A). It will be appreciated, however, that other implementations are possible, and other components may be utilized to implement the exemplary method. It will be readily appreciated that the illustrated method may be altered to modify the order of steps, or further include additional steps.

In step 610, system 121 (shown in FIG. 1A) may receive a playback request 175, as shown in FIG. 1B, from a user device (e.g., user device 131, as shown in FIG. 1A). In some embodiments, the request may include a content identifier. In some embodiments, a software application installed on user device 131 (e.g., QuickTime, Windows media player, VLC player, and the like) may be used to play a video stream requested by device 131. In some other embodiments, user device 131 may be a dedicated multimedia playing device (e.g., Roku Set top box, Apple TV, Google Chromecast or Amazon Fire TV). In various cases, request 610 may include information related to a user or user device 131. For example, request 610 may include a device ID (e.g., device ID 510, as shown in FIG. 5), or information about an account of the user. In some cases, when request 610 does not explicitly contain device ID information, system 121 may be configured to analyze the information contained in request 610 and associate a device ID corresponding to device 131. For example, system 121 may obtain account information of the user based on information contained in request 610, and retrieve from the user's account the device ID for device 131.

In step 620, system 121 (or server 110), as shown in FIG. 1A may prepare manifest file 156 (shown in FIG. 1A) with content segments (e.g., video segments 190 and ad segments 191, as shown in FIG. 1B). In various embodiments, manifest file 156 may include at least one video segment identifier and additional metadata information.

In step 630, system 121 (shown in FIG. 1A) may receive a request for a content segment based on a content segment identifier present in a manifest file. The content segment identifier may directly point to specific content, or maybe a generic identifier that may be mapped to a content-specific identifier such as a link by using a set of selection rules in step 640.

In step 640, system 121 (shown in FIG. 1A) may apply selection rules to determine whether video segments or ad segments may be provided to player 111 (shown in FIG. 1A). For example, player 111 may request TSR 330 (shown in FIG. 3) to transmit video segment 180, as shown in FIG. 1B. TSR 330 may receive the request (e.g., request 175, as shown in FIG. 1B) and determine if video segment 180 or an ad segment will be transmitted to player 111. If an ad segment needs to be provided to player 111, system 121 may use system 340 (shown in FIG. 3) and process 600, as shown in FIG. 6A, to determine the appropriate ad segment (e.g., ad segment 181, as shown in FIG. 1B). System 340 may request TSR 330 to transmit ad segment 181 to player 111, and after transmission of ad segment 181, transmit video segment 180, as previously requested by player 111.

If system 121 (shown in FIG. 1A), in step 640, determines that a video segment needs to be transmitted to player 111 (step 640, Video Segment) process 601 may proceed to step 650 and select a content segment associated with an identifier such as a link received from player 111 (shown in FIG. 1A), where the link may be obtained from request 175 (shown in FIG. 1B). In some cases, the link may be also obtained from table 500, as table 500 may track which video segment was played last on player 111.

Alternatively, if system 121 (shown in FIG. 1A), in step 640, determines that an ad segment needs to be transmitted to player 111, as shown in FIG. 1A (step 640, Ad Segment), process 601 may proceed to step 660. In step 660, system 121 may select an ad segment from an alternative source stored locally or may request Ad server 240 (shown in FIG. 2) to supply the ad segment from the alternative source.

In step 670, system 121 (shown in FIG. 1A) may send the segment selected in steps 650 or 660 to player 111. In some cases, system 121 may interact with server 110 and/or database 290 (shown in FIG. 2) to obtain video segment 180 or ad segment 181 (shown in FIG. 1B) that needs to be transmitted to player 111.

Figure 7A:
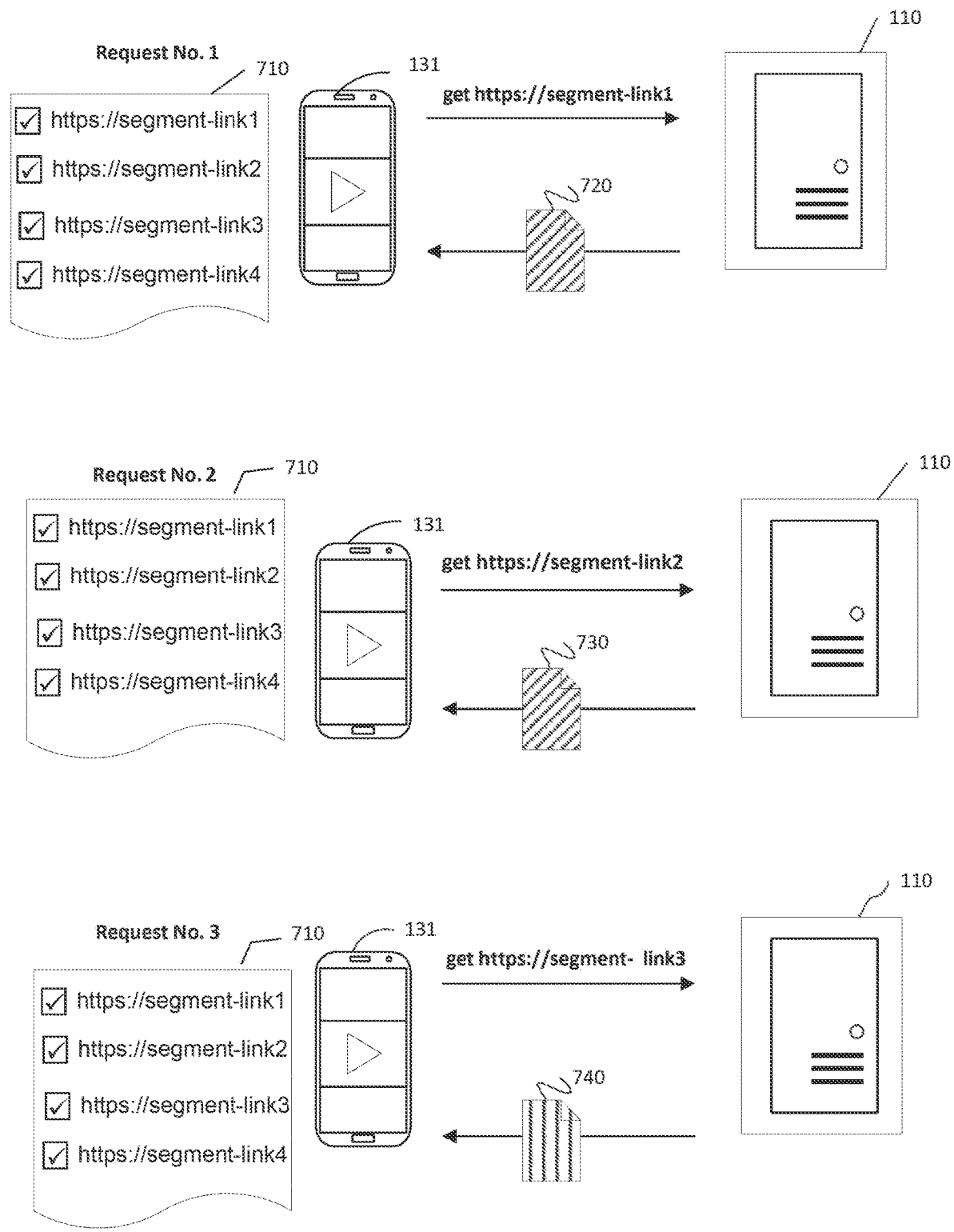
FIGS. 7A and 7B are example flow diagrams illustrating communication between a content distribution service and a viewing device consistent with the disclosed embodiments.
Figure 7B:
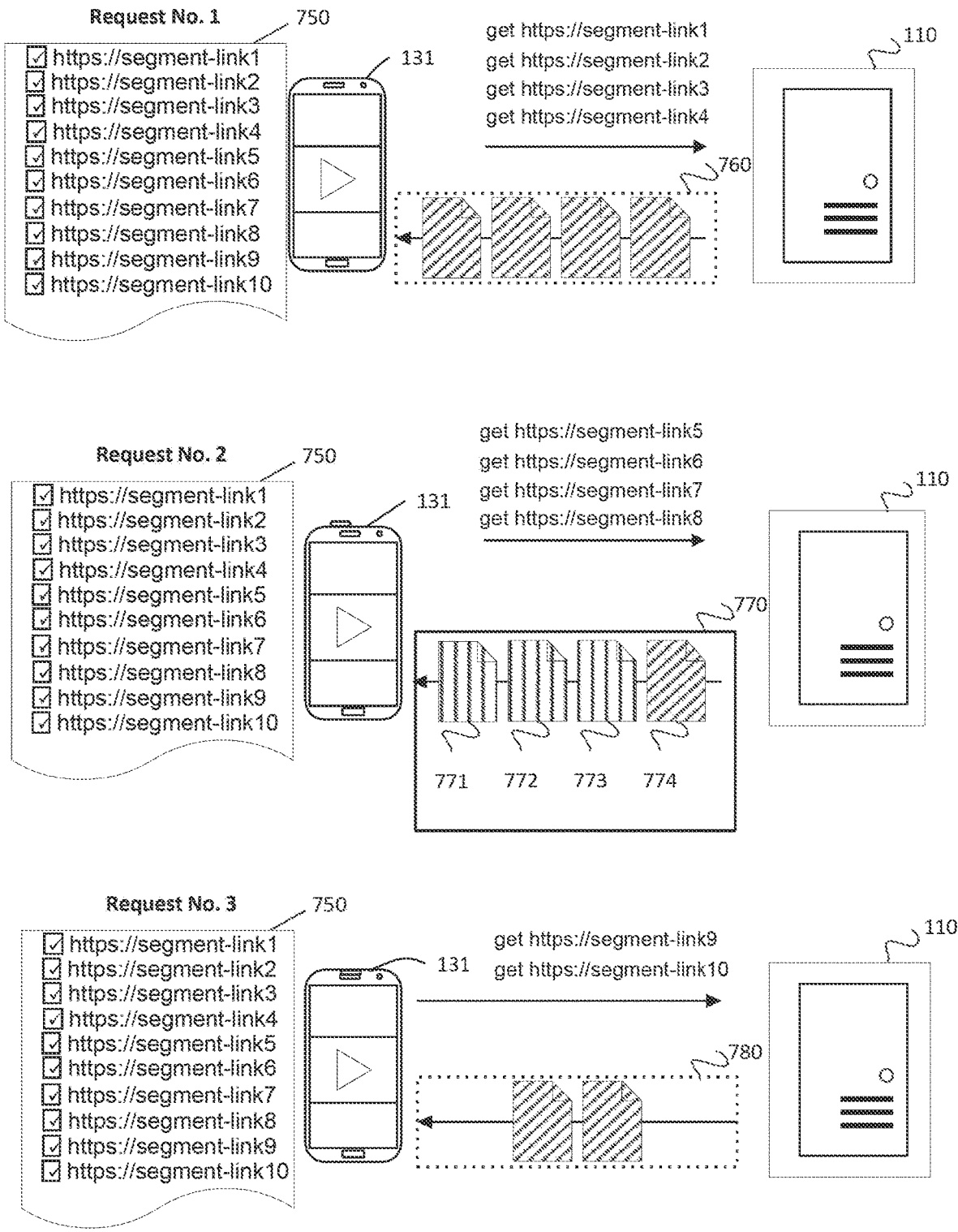

FIG. 7A and FIG. 7B are illustrative flow diagrams of communication between server 110 (shown in FIG. 1A) and user device 131 (shown in FIG. 1A). FIG. 7A illustrates three sequential requests for content segments requested by user device 131 from server 110, based on the segment identifiers in manifest file 710. The checkmarks in the example manifest file 710 may be a visual indicator, and manifest file 710 may keep track of the segment identifiers requested via request 175 (shown in FIG. 1B) and provided by server 110 in any other suitable way. The first request (Request No. 1) may include device 131 requesting a video segment 720, and subsequently receiving video segment 720 from server 110. The second request (Request No. 2) may include device 131 requesting a next video segment 730 and subsequently receiving segment 730 from server 110. The third request (Request No. 3) may include device 131 requesting a next video segment and receiving instead an ad segment 740 from server 110.

FIG. 7B illustrates three sequential requests for content segments requested by user device 131 (shown in FIG. 1A) from server 110 (shown in FIG. 1A) based on the segment identifiers in manifest file 710 shared by server 110 with user device 131 as part of the original request for content playback. Unlike the flow diagram shown in FIG. 7A, user device 131, as shown in FIG. 7B makes batch requests for content segments.

In the first request for the content segment based on segment identifiers listed in manifest file 750, user device 131 (shown in FIG. 1A) sends request 175 (shown in FIG. 1B) that includes four-segment identifiers to server 110. The server 110 returns the first batch of content segments 760. In some embodiments, user device 131 may make an immediate second request for a new set of content segments. In some other embodiments, the user device 131 may wait until it plays all the four segments. In yet some other embodiments, the user device 131 may make a request for content segments after playing a subset of previously returned content segments.

In the second request to server 110 (shown in FIG. 1A), the user device 131 (shown in FIG. 1A) may request another four content segments associated with four-segment identifiers. The server 110 may return a batch of segments 770, of which three segments (segments 771-773) may be ad segments, and the last segment 774 may be a video segment. The number of ad segments may be limited by the number of video segments available for the next request. In various embodiments, server 110 is configured to serve all the video segments as requested by player 111 (shown in FIG. 1A). Thus, video segments may be prioritized when the number of available video segment requests is below a certain threshold.

In the third request, user device 131 (shown in FIG. 1A) requests the last two content segments. Server 110 (shown in FIG. 1A) may not us TSR 330 (shown in FIG. 3) or other components of system 100 to determine the source of the content as user device 131 has only two video segment identifier requests available. The server 110 returns a batch of two video segments 780 to the device 131 without inserting any ad segments.

The disclosed systems and methods may apply to multiple content delivery schemes and may be adaptable to different delivery infrastructures. For example, the disclosed systems and methods can be used with multiple encoding, encryption, and packaging technologies. In some embodiments, the disclosed methods may be applied to constant bitrate (CBR), average bitrate (ABR), and variable bitrate (VBR) encodings. Moreover, the disclosed methods may be employed with multiple packaging technologies such as common media application format (CMAF), MPEG-DASH, HTTP live streaming (HLS), among others. Further, the disclosed systems and methods may be independent of the streaming method used by the client.

Further, the disclosed systems and methods can operate with any version of HTTP(s) and caching protocols. Furthermore, the disclosed systems and methods may reduce latency and improve user experience by employing architectures that use server caching capabilities. Using cache capabilities within various components of system 100 (shown in FIG. 1A), such as a content determination system 140 (shown in FIG. 1A), may allow reducing content traffic flow to minimize latency. For example, in the disclosed systems and methods, multimedia content may be prepared and preloaded in system 140 located in the proximity of the user device 131 (shown in FIG. 1A), thereby improving response times. Such an arrangement of data enables the transmission of multimedia content with minimal latency.

Various components of system 100 (shown in FIG. 1A) may include various devices, such as processors, memory devices, and various user devices. For example, user devices 130 (shown in FIG. 1A) may include one or more computing devices configured to perform one or more operations consistent with disclosed embodiments. For example, user devices 130 may include a desktop computer, a laptop, a server, a mobile device (e.g., tablet, smartphone, etc.), a set-top box, a gaming device, a wearable computing device, a television (TV), a smart TV, an Apple TV, an Android TV, a video player, a car video player (e.g., headrest video player) or any other suitable device for media playback. User devices 130 may include one or more processors configured to execute software instructions stored in memory, such as memory included in user devices 130, to perform operations to implement the functions related to requesting multimedia content, receiving the multimedia content, and playing the multimedia content. User devices 130 may be configured for wired and/or wireless communications and may include software that, when executed by a processor, performs internet-related communication (e.g., TCP/IP) and content display processes. For instance, user devices 130 may execute browser software that generates and displays interfaces, including content on a display device included in or connected to user devices 130. User devices 130 may execute applications that allow user devices 130 to communicate with components over network 280 (shown in FIG. 2) and generate and display content in interfaces via display devices included in user devices 130. For example, user devices may display a media player to output content received from server 110 (shown in FIG. 1A) or edge computing systems 120 (shown in FIG. 1A).

The disclosed embodiments are not limited to any configuration of user devices 130 (shown in FIG. 1A). For instance, a user device 131 (shown in FIG. 1A) may be a mobile device that stores and executes an application to perform operations for requesting, receiving, and playing the multimedia content. In certain embodiments, user devices 130 may be configured to execute software instructions relating to location services, such as GPS locations. For example, user devices 130 may be configured to determine a geographic location and provide location data and time stamp data corresponding to the location data to server 110.

Server 110 (shown in FIG. 1A) may include one or more computing systems that perform operations to store and provide multimedia content. Server 110 may include databases that include multimedia content, such as videos or movies. Server 110 may also include processors that perform authentication functions of user devices 130, users of user devices 130 (shown in FIG. 1A), and/or resolve client identities based on client IDs and/or a security token. In some embodiments, server 110 may include processors configured to encode content and packet content in different formats. Further, server 110 may include processing devices to resolve URLs and map different segments of advertisement and content. In some embodiments, server 110 may include multiple core processors to handle concurrently multiple operations and/or streams. For example, server 110 may include parallel processing units to handle concurrent requests of multiple user devices 130.

In some embodiments, server 110 (shown in FIG. 1A) may store the original version of multimedia content and send copies with different configurations to edge computing systems 120 (shown in FIG. 1A). For example, server 110 may compress an original video file and send it to edge computing system 121 (shown in FIG. 1A), which may then store it in the cache. In such embodiments, server 110 may allow automatic requests from system 121. However, in other embodiments, server 110 may implement firewalls that only allow a limited number of pull requests or only allow periodic pull requests to update content. Server 110 may be configured to handle automatically specific requests from system 121. For example, when edge computing system 121 performs a pull request due to a 'cache miss,' server 110 may be configured to redirect system 121 to a different memory address. In such embodiments, server 110 may include a relational database, or other similar data structures, to correlate the pull request from system 121 with an address that has a copy of multimedia content and/or advertising content. Further, server 110 may include dedicated hardware to perform redirecting operations. For example, server 110 may include a simple RISC computer (SRC) architecture, or other reconfigurable computing systems, specifically configured to handle pull requests with 'cache miss.'

Database 290 (shown in FIG. 2) may include one or more computing devices configured with appropriate software to perform operations for providing multimedia content to server 110 (shown in FIG. 2), Database 290 may include, for example, Oracle™ database, Sybase™ database, or other relational databases or non-relational databases, such as Hadoop™ sequence files, HBase™, or Cassandra™, Couchbase, MongoDB, DocumentDB, DynamoDB, MySql, Aurora, RedShift, Elasticsearch, and the like. In an illustrative embodiment, database 290 may include computing components (e.g., database management system, database server, etc.) configured to receive and process requests for data stored in memory devices of the database and to provide data from the database.

Database 290 (shown in FIG. 2) may be configured to collect and/or maintain the data associated with user accounts and user preferences. For example, database 290 may store information about user privileges. Database 290 may collect the data from a variety of sources, including, for instance, online resources.

System 100 (shown in FIG. 1A) may include various types of connections between various computing components. For example, system 100 may facilitate the exchange of information via network connections that may include Internet connections, Local Area Network connections, near field communication (NFC), or other suitable connection(s) that enables the sending and receiving of information between the components of system 100. In some embodiments, one or more components of system 100 may communicate directly through a dedicated communication link(s).

As described above, edge computing system 121 (shown in FIG. 1A) may transmit multimedia content to user device 131 (shown in FIG. 1A). System 121 may store content in local memories, such as caching infrastructures associated with system 121, local proxies, and/or the HTTP caching capability. In some embodiments, system 121 may perform functions such as routing content, resolving domain systems, handling content requests, and creating sessions with user devices for content delivery. System 121 may obtain information from other computing systems (e.g., server 110 or computing system 122, as shown in FIG. 1A), arrange it for user devices, and deliver it to user devices 130 (shown in FIG. 1A). In such embodiments, system 121 may be configured to handle multiple streams in parallel, such as providing different data streams to multiple user devices 130. Further, system 121 may be configured to provide authentication credentials to user devices 130. For example, edge computing system 121 may provide a secure cookie, or an equivalent technique for authentication, at a session startup time.

In some embodiments, system 121 may include a server, a general-purpose computer, a mainframe computer, or any combination of these components. System 121 may be configured to communicate with one or more databases, such as database 290 (shown in FIG. 2), and other elements of system 100 either directly or via network connections.

System 121 may include one or more storage devices configured to store instructions used by processors of system 121 to perform functions related to disclosed embodiments. For example, memory storage devices may store software instructions.

In some embodiments, processors of system 121 (shown in FIG. 1A, such as processors 141 of system 140, as shown in FIG. 1A) may include one or more known processing devices, such as, but not limited to, microprocessors from the Pentium™ or Xeon™ family manufactured by Intel™, the Turion™ family manufactured by AMD™, or any of various processors from other manufacturers. However, in other embodiments, processors 141 may be a plurality of devices coupled and configured to perform functions consistent with the disclosure. For example, processors 141 may include a plurality of co-processors, each configured to run specific content determination system 140 operations such as floating-point arithmetic, graphics, signal processing, string processing, cryptography or I/O interfacing. In some embodiments, processors may include a field-programmable gate array (FPGA), central processing units (CPUs), graphical processing units (GPUs)), and the like.

It is to be understood that the configuration and the functionality of components of system 100 (shown in FIG. 1A) have been defined herein for the convenience of the description. Alternative configurations can be defined if the specified functions and relationships thereof are appropriately performed. Alternatives (including equivalents, extensions, variations, deviations, etc., of those described herein) will be apparent. Such alternatives fall within the scope and spirit of the disclosed embodiments.

The preceding description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A system for selection of advertisement segments, the system comprising at least one processor executing executable computer code configured to:
   receive a playback request from a playback unit;
   receive user information associated with a user;
   evaluate, using the user information, a user advertisement metric associated with a preference of the user for a particular type of advertisement;
   calculate a certainty of the user advertisement metric based on a variance associated with the user advertisement metric, wherein the variance is calculated using an average score for a group of users and a deviation from the average score;
   select an advertisement segment based on the user advertisement metric and the calculated certainty; and
   send the selected advertisement segment to the playback unit,
   wherein the user advertisement metric is based at least in part on whether the user skips advertisements associated with the particular type of advertisement in a forward or backward direction and cached segments associated with the skipped advertisements.

2. The system of claim 1, wherein the at least one processor is further configured to calculate a user preference for a plurality of advertisement classifications.

3. The system of claim 2, wherein the advertisement classifications are based on at least one of advertisement topic, user demographic, humor level, stream content, or preference of other users.

4. The system of claim 1, wherein the at least one processor is further configured to:
   send the user advertisement metric to a plurality of advertisement bidders;
   receive a plurality of advertisement biddings, each bidding corresponding to an advertisement segment; and send the advertisement segment associated with a highest bidding to the playback unit.

5. The system of claim 1, wherein the at least one processor is further configured to evaluate the user advertisement metric using one or more user advertisement metrics for other users.

6. The system of claim 1, wherein the at least one processor is further configured to generate a correlation plot corresponding to interest of the user in the type of advertisement over time.

7. The system of claim 6, wherein the at least one processor is further configured to evaluate the user advertisement metric by using at least in part the correlation plot.

8. The system of claim 1, wherein the user information comprises at least one of an age of the user, an occupation of the user, a location of the user, a request for video content by the user, a social media information available for the user, an Internet search history of the user, or at least one purchase of the user.

9. A computer-implemented method for selection of advertisement segments, the method comprising:
receiving a playback request from a playback unit;
receiving user information associated with a user;
evaluating, using the user information, a user advertisement metric associated with a preference of the user for a particular type of advertisement;
calculating a certainty of the user advertisement metric based on a variance associated with the user advertisement metric, wherein the variance is calculated using an average score for a group of users and a deviation from the average score;
selecting an advertisement segment based on the user advertisement metric and the calculated certainty; and
sending the selected advertisement segment to the playback unit,
wherein the user advertisement metric is based at least in part on whether the user skips advertisements associated with the particular type of advertisement in a forward or backward direction and cached segments associated with the skipped advertisements.

10. The method of claim 9, further comprising calculating a user preference for a plurality of advertisement classifications.

11. The method of claim 10, wherein the advertisement classifications are based on at least one of advertisement topic, user demographic, humor level, stream content, or preference of other users.

12. The method of claim 9, further comprising;
receiving a plurality of advertisement biddings, each bidding corresponding to an advertisement segment; and
sending the advertisement segment associated with a highest bidding to the playback unit.

13. The method of claim 9, further comprising evaluating the user advertisement metric using one or more user advertisement metrics for other users.

14. The method of claim 9, further comprising generating a correlation plot corresponding to interest of the user in the type of advertisement over time.

15. The method of claim 14, further comprising evaluating the user advertisement metric by using at least in part the correlation plot.

16. The method of claim 9, wherein the user information comprises at least one of an age of the user, an occupation of the user, a location of the user, a request for video content by the user, a social media information available for the user, an Internet search history of the user, or at least one purchase of the user.

* * * * *